(12) United States Patent
Kuntimaddi

(10) Patent No.: US 7,087,699 B2
(45) Date of Patent: Aug. 8, 2006

(54) SULFUR-CONTAINING COMPOSITION FOR GOLF EQUIPMENT, AND METHOD OF USING SAME

(75) Inventor: Manjari Kuntimaddi, Plymouth, MA (US)

(73) Assignee: Acushnet Company, Fairhaven, MA (US)

( * ) Notice: Subject to any disclaimer, the term of this patent is extended or adjusted under 35 U.S.C. 154(b) by 89 days.

(21) Appl. No.: 10/847,509

(22) Filed: May 17, 2004

(65) Prior Publication Data

US 2005/0256279 A1   Nov. 17, 2005

(51) Int. Cl.
*C08G 75/00* (2006.01)
*C08G 71/00* (2006.01)
*C08G 59/62* (2006.01)
*C08G 59/50* (2006.01)
*A63B 37/00* (2006.01)

(52) U.S. Cl. .................. 528/73; 528/64; 525/454; 525/528; 473/378

(58) Field of Classification Search .............. None
See application file for complete search history.

(56) References Cited

U.S. PATENT DOCUMENTS

| | | | | |
|---|---|---|---|---|
| 3,897,400 A | * | 7/1975 | Finelli .................... | 528/64 |
| 3,912,566 A | * | 10/1975 | Andrews et al. ............ | 156/330 |
| 4,068,849 A | | 1/1978 | DiSalvo et al. ............. | 273/218 |
| 5,807,975 A | | 9/1998 | Amagai et al. ............. | 528/373 |
| 5,908,358 A | * | 6/1999 | Wu ............................ | 473/378 |
| 5,945,504 A | | 8/1999 | Amagai et al. .............. | 528/373 |
| 5,981,654 A | | 11/1999 | Rajagopalan ............... | 525/66 |
| 6,001,930 A | | 12/1999 | Rajagopalan ............... | 525/92 |
| 6,245,862 B1 | | 6/2001 | Rajagopalan .............. | 525/340 |
| 6,284,840 B1 | | 9/2001 | Rajagopalan ............... | 525/92 |
| 6,294,617 B1 | | 9/2001 | Rajagopalan .............. | 525/425 |
| 6,386,992 B1 | | 5/2002 | Harris et al. ............... | 473/371 |
| 6,645,088 B1 | | 11/2003 | Wu et al. .................. | 473/367 |
| 2002/0032278 A1 | | 3/2002 | Rajagopalan et al. ......... | 525/88 |
| 2002/0040111 A1 | | 4/2002 | Rajagopalan .............. | 525/425 |
| 2002/0187857 A1 | | 12/2002 | Kuntimaddi et al. ....... | 473/373 |
| 2002/0193179 A1 | | 12/2002 | Harris et al. ............... | 473/356 |
| 2003/0078348 A1 | | 4/2003 | Rajagopalan et al. ....... | 525/425 |
| 2003/0149217 A1 | | 8/2003 | Bojkova et al. ............. | 528/75 |

* cited by examiner

*Primary Examiner*—David J. Buttner
(74) *Attorney, Agent, or Firm*—Mandi B. Milbank

(57) ABSTRACT

This invention is directed to a sulfur-containing composition that can be used as golf items such as golf ball components and golf equipments. The sulfur-containing composition comprises the reaction product of four reactable components: (a) polyisocyanates and polyisothiocyanates; (b) polyols and polythiols; (c) epoxides and episulfides; and (d) amines and anilines; at least one of the four reactable components contains a sulfur atom. This invention also relates to a reaction injection molding process, a castable molding process and other methods using the sulfur-containing composition.

1 Claim, 2 Drawing Sheets

SULFUR-CONTAINING COMPOSITION FOR GOLF EQUIPMENT, AND METHOD OF USING SAME

TECHNICAL FIELD

This invention relates to a sulfur-containing composition for forming golf equipment or components thereof, particularly for forming layers of golf balls. The sulfur-containing composition comprises the reaction product of four reactable components: (a) polyisocyanates and polyisothiocyanates; (b) polyols and polythiols; (c) epoxides and episulfides; and (d) amines and anilines; at least one of the four reactable components contains a sulfur atom. This invention also relates to a reaction injection molding process, a castable molding process and other methods using the sulfur-containing composition.

BACKGROUND OF THE INVENTION

It is well known to golfer that the equipment used in playing the game is subject to a great deal of friction, impact, and other stresses during a typical round of golf. Both the performance and the useful life of such equipment would benefit from the use of materials having increased durability. For instance, many types of golf clubs, such as putters, drivers, and wedges, contain polymer inserts in the face of the club. Since the club face directly strikes a golf ball thousands of times over the life of the club, improved durability is of great importance. Additionally, club components, such as shafts, grips, and hosels, undergo significant stress during a golf swing and contact with a golf ball and, therefore, could stand to benefit from more durable materials.

Golf balls are repeatedly struck against very hard objects as well, including golf clubs, and it is very desirable to maintain their performance properties over as long a period of time as possible. Golfers of all skill levels seek out a variety of properties in their golf balls for a variety of golfing situations, although resilience, durability, and longevity are always important. The type of materials used in forming the different golf ball layers can greatly affect these properties, as well as the "click," "feel," spin, initial velocity, "playability," and other properties.

Golf equipment is typically formulated from a variety of different materials. Most conventional materials, however, do not entirely address the problems associated with stress, durability, and repeated impact. Therefore, it is clear that improved materials, having material properties that address these preferred physical requirements, are necessary.

In addition, the manner in which golf equipment, or components thereof, is fabricated can affect certain properties of the materials, for example, such as durability. The types of chemistries present in the golf equipment materials can also sometimes indicate or dictate the preferred method of fabrication used to form them.

Particularly with respect to polyurethane-containing materials, commercially available golf equipment or components, especially for golf balls, can be currently made by casting or injection molding processes. The nature of current casting processes is such that materials that require a relatively long time (in comparison to other fabrication methods) to sufficiently solidify, i.e., react thoroughly. As a result, materials or compounds with particular chemistries that react or solidify relatively quickly are generally restricted from use in commercial casting processes, particularly in the golf art.

By using an alternative fabrication technique, reaction injection molding, as opposed to traditional injection molding, thermosetting materials and/or materials with relatively quick reaction or solidification times can be processed into certain articles. Reaction injection molding processes, due to the nature of the chemistries of the materials used, tend to result in decreased fabrication times, and can facilitate a decrease in the cost of fabricating such articles. The technique of reaction injection molding (RIM) using a variety of materials has been demonstrated in various publications.

For example, U.S. Pat. No. 4,762,322 discloses golf clubs with heads that can be made from a hollow metal shell or a low density, high strength material, such as a reaction injection molded polyurethane, formed around weighted inserts.

With respect to manufacture of golf balls, RIM has been disclosed, for example, in International Publication No. WO 00/57962, which claims golf balls, and processes for making such balls, comprising a reaction injection molded material, such as polyurethanes/polyureas.

In addition, U.S. Pat. No. 6,083,119 discloses a multi-layer golf ball with an inner and outer cover layer, at least one of which can contain a reaction injection molded polyurethane material.

U.S. Pat. Nos. 4,695,055 and 4,878,674 also disclose illuminated, translucent golf balls having a permanent diametric hole into which a chemiluminescent light stick is added, so that the golf balls may be visible in the dark. These golf balls can be fabricated by a method such as reaction injection molding.

Additionally, conventional non-reactive injection molding can be used to form relatively thin layers of material in golf equipment, or components thereof, generally in golf balls. Examples of thin components or layers made by conventional non-reactive injection molding have also been demonstrated in various publications.

U.S. Pat. No. 6,645,088 to Wu et al., which is incorporated herein by reference in its entirety, relates to a method for forming golf equipment or components thereof by providing a first reactable component containing an isocyanate-containing compound, and a second reactable component containing at least one polyol, polyamine, or epoxy-containing compound, mixing these reactable components to form a reactive mixture and injecting the reactive mixture into a mold or cavity. However, this reference does not teach or suggest the use of any sulfur-containing reactable components, and therefore, it does not teach or suggest any sulfur-containing components such as polyurethanes, polyureas, polyols, polyamines, epoxy-containing compounds, or mixtures thereof.

U.S. patent application publication 2003/0149217 by Bojkova et al., which is incorporated herein by reference in its entirety, is directed to the use of a sulfur-containing polyureaurethane in making optical lenses having an adequate refractive index of at least 1.57, an Abee number of at least 35 and a density of less than 1.3 grams/cm$^3$, and good impact resistance and strength. The Bojkova reference discloses the polyureaurethane as a reaction product of (a) at least one of polyisocyanate and polyisothiocyanate and at least one hydrogen-containing material chosen from polyols, polythiols and materials having both hydroxyl and thiol functional groups; (b) at least one episulfide-containing material; and (c) an amine-containing curing agent.

However, as golf ball equipment or components thereof, particularly for forming layers of golf balls having improved impact resistance, the use of polythiourethane or polythiourea involving (a) one of polyisocyanate and polyisothicyanate and at least one hydrogen-containing material chosen from polyols, polythiols and materials having both hydroxyl and thiol functional groups; and (b) at least one episulfide-containing material; and (c) an amine-containing curing agent is not known.

U.S. Pat. No. 4,068,849 to DiSalvo et al., which is incorporated herein by reference in its entirety, discloses a golf ball composition having an unsaturated elastomer cross linked with a chain comprising the reaction product of a monohydric alkenyl ester and a diisocyanate or a diisothiocyanate. According to the DiSalvo reference, the combination of chemical functionalities in the cross linking agent is believed to be responsible for improved resilience in the cured golf ball. However, the DiSsalvo reference contains no teaching or suggestion of the use of polyols, polythiols and materials having both hydroxyl and thiol functional groups, episulfide-containing materials and amine-containing curing agents.

U.S. Pat. No. 6,386,992 to Harris et al., U.S. Pat. No. 6,294,617 to Rajagopalan, U.S. Pat. No. 6,284,840 to Rajagopalan et al., U.S. Pat. Nos. 6,245,862, 6,001,930 and 5,981,654 to Rajagopalan, which are incorporated herein by reference in their entireties, are directed to the use of block copolythiourethane using isocyanates, isothiocyanates, diols, dithiols and thio-substituted alcohols. According to these references, there is no teaching or suggestion of the use of polyols, polythiols and materials having both hydroxyl and thiol functional groups, episulfide-containing materials and amine-containing curing agents.

U.S. patent application publications 2003/0078348 by Rajagopalan et al., 2002/0193179 by Harris et al., 2002/0040111 by Rajagopalan, and 2002/0032278 by Rajagopalan et al., which are incorporated herein by reference in their entirety, are also directed to the use of block copolythiourethane using isocyanates, isothiocyanates, diols, dithiols and thio-substituted alcohols. According to these references, there is no teaching or suggestion of the use of polyols, polythiols and materials having both hydroxyl and thiol functional groups, episulfide-containing materials and amine-containing curing agents.

SUMMARY OF THE INVENTION

This invention is directed to a sulfur-containing composition for golf equipment, comprising four reactable components. The first reactable component comprises a polyisocyanate, a polyisothiocynate, or a combination thereof. The second reactable component comprises a polyol, a polythiol, or a combination thereof. The third reactable component comprises an epoxide, an episulfide, or a combination thereof. The fourth reactable component comprises an amine, an aniline or a combination thereof. At least one of the four reactable components contains a sulfur atom.

In one embodiment of the invention, there is only one reactable component having a sulfur atom as in (a) the first reactable component, (b) the second reactable component, (c) the third reactable component, or (d) the fourth reactable component.

In a different embodiment of the invention, there are two reactable components having a sulfur atom as in (a) the first and the second reactable components, (b) the first and the third reactable components, (c) the first and the fourth reactable components, (d) the second and the third reactable components, (e) the second and the fourth reactable components, or (f) the third and the fourth reactable components.

In another embodiment of the invention, there are three reactable components having a sulfur atom as in (a) the first, the second and the third reactable components, (b) the first, the second and the fourth reactable components, (c) the first, the third and the fourth reactable components, or (d) the second, the third and the fourth reactable components.

In yet another embodiment of the invention, all four reactable components contain a sulfur atom. In this embodiment, the first reactable component comprises 1-isocyanato-2-isothiocyanatoethane, 1,2-diisothiocyanatoethane, 1-isocyanato-3-isothiocyanatopropane, 1,3-diisothiocyanatopropane, 1-isocyanato-4-isothiocyanatobutane, 1-isocyanto-6-isothiocyanatohexane, 1,6-diisothiocyanatohexane, 1-isocyanato-6-isothiocyanto-2,2,4-trimethylhexane, 1,6-disisothiocyanato-2,2,4-trimethylhexane, 1-isocyanato-12-isothiocyanatododecane, 1,12-diisothiocyanatododecane, 1-isocyanato-6-isothiocyanto-2,4,4-trimethylhexane, 1,6-diisothiocyanto-2,4,4-trimethylhexane, 4-isocyanato-4'-isothiocyanatodicylohexylmethane, 4,4'-diisothiocyanatodicylohexylmethane, 1-isocyanato-3-isothiocyanatocyclobutane, 1,3-diisothiocyanatocyclobutane, 1-isocyanato-3-isothiocyanatocyclohexane, 1,3-diisothiocyanatocyclohexane, 1-isocyanato-4-isothiocyanatocyclohexane, 1,4-diisothiocyanatocyclohexane, methyl-cyclohexylene diisothiocyanate, 1-isocyanato-3,3,5-trimethyl-5-isothiocyanatomethyl cyclohexane, 1-isothiocyanato-3,3,5-trimethyl-5-isothiocyanatomethyl cyclohexane, isophoronediisothiocyanate, 4,4'-diphenylmethane diisothiocyanate, polymeric 4,4'-diphenylmethane diisothiocyanate, carbodiimide-modified liquid 4,4'-diphenylmethane diisothiocyanate, p-phenylene diisothiocyanate, m-phenylene diisothiocyanate, toluene diisothiocyanate, 3,3'-dimethyl-4,4'-biphenylene diisothiocyanate, naphthalene diisothiocyanate, xylylene diisothiocyanate, tetracene diisothiocyanate, anthracene diisothiocyanate, the isocyanurate of toluene diisothiocyanate, the isocyanurate of hexamethylene diisothiocyanate, the uretdione of toluene diisothiocyanate, the uretdione of 1,6-hexamethylene-diisothiocyanate, or mixtures thereof. In addition, the second reactable component comprises a polyol having a sulfur atom, a polythiol, or a mixture thereof. Also, the third reactable component comprises an epoxide having a sulfur atom, an episulfide, or a mixture thereof. Furthermore, the fourth component comprises an amine having a sulfur atom, an aniline having a sulfur atom.

The invention is also directed to a golf item, formed from a sulfur-containing composition comprising a reaction mixture comprising the four reactable components. The four reactable components have a viscosity of less than about 20,000 cPs at ambient temperature or at a temperature at which the reactive mixture is formed.

In a different embodiment of the golf item, the first reactable component comprises greater than about 14 percent isocyanate or isothiocyanate by weight of the first reactable component. In another embodiment, the golf item is a golf ball component. In yet another embodiment, the golf ball component comprises an outer cover layer having a first material hardness of about 55 Shore D or greater and an inner cover layer having a second material hardness of about 55 Shore D or less. The golf ball further comprises a core having an outer diameter of about 1.55 inches to about 1.67 inches. In a different embodiment, the golf ball component has a thickness of about 0.065 inches or less.

In one embodiment, the second reactable component comprises a polyether polyol, a hydroxy-terminated polybutadiene, a polyester polyol, a polycarbonate polyol, a copolymer, or mixtures thereof.

In another embodiment, the four reactable components have a viscosity of less than about 10,000 cPs at ambient temperature or at a temperature at which the reactive mixture is formed. In yet another embodiment, the reactive mixture is injected into the mold within a timeframe of about 0.25 seconds to about 30 seconds. In a different embodiment, the timeframe is about 1 second to about 5 seconds.

In one embodiment, the reactive mixture further comprises at least one catalyst comprising a metal catalyst, an amine catalyst, an organic acid, a delayed catalyst, or mixtures thereof. In a different embodiment, the at least one catalyst is present in an amount from about 0.001 percent to about 3 percent by weight of the composition. In another embodiment, the reactive mixture further comprises at least one filler present in an amount from about 0.1 percent to about 50 percent by weight of the reactive mixture.

The invention is also directed to a multi-layer golf ball comprising at least one core layer and a cover comprising an inner cover layer and an outer cover layer disposed about the at least one core layer. At least one of the cover layers is formed from a reaction injection molded material having the four reactable components. In one embodiment, the golf ball comprises a solid or fluid-filled core. In a different embodiment, the golf ball further comprises at least one intermediate layer disposed about the at least one core layer. In another embodiment, the intermediate layer is a wound layer or comprises a reaction-injection-molded material.

This invention is further directed to a method for forming golf equipment, or a portion thereof, comprising the steps of providing the four reactable components, combining the reactable components together to form a reactive mixture, and injecting the reactive mixture into a cavity or mold having a desired shape within about 60 seconds after the combining to avoid substantial gelation or solidification so as to provide at least a portion of the golf equipment. In one embodiment, the first reactable component comprises greater than about 14 percent by weight of unreacted isocyanate and isothiocyanate groups.

BRIEF DESCRIPTION OF THE DRAWINGS

Further features and advantages of the invention can be ascertained from the following detailed description that is provided in connection with the drawings described below.

Figure 1:
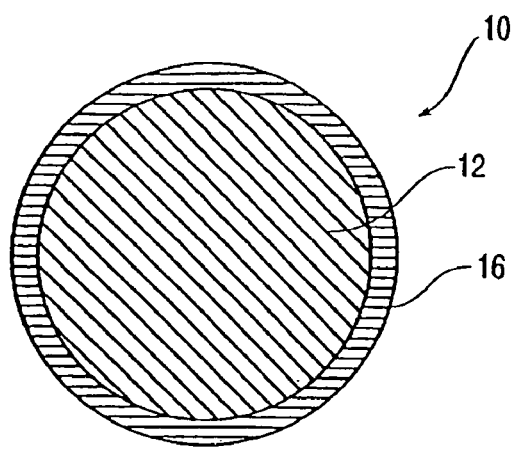
FIG. 1 illustrates a golf ball including a center and a cover layer disposed over the center, in which at least one of the center or the cover layer includes a reaction injection molded material according to the invention.

These FIGS. are not necessarily drawn to scale.

DEFINITIONS

As used herein, the term "golf equipment" includes any type of equipment used in connection with golf, including, but not limited to, golf balls; golf clubs (e.g., putters, drivers, and wedges) and club attachments, additions, or modifications, such as striking face inserts; golf club components (e.g., shafts, hosels, and grips); golf club vibration damping devices; golf gloves; golf shoes; and any portion of the above items.

As used herein, the phrase "substantial gelation or solidification" refers generally to viscosity increases sufficient to prevent or substantially retard flow of a material into a mold or cavity or through an orifice.

The term "catalyst," as used herein, should be understood by one of ordinary skill in the art to include only those compounds which facilitate, or increase the rate of, a particular reaction and which are not substantially consumed by themselves reacting with one or more of the necessary components of the particular reaction. For example, any compound containing an accessible and reactive amine, epoxy, or hydroxyl group that should readily react with an isocyanate group should be considered a reactable component (e.g., a curing agent) and not a catalyst.

As used herein, the term "fluid" includes a liquid, a paste, a gel, a gas, or any combination thereof. It should be understood that the term "fluid-filled," as used herein in reference to golf equipment or to a portion thereof, also includes the situation where the golf equipment, or the portion thereof, is hollow.

As used herein in reference to a golf ball, the term "core" represents the center and optional additional layer(s), such as an intermediate layer, which layer(s) is (are) disposed between the center and the cover of the golf ball.

The term "prepolymer," as used herein, refers to a material containing at least one isocyanate-containing component, and at least one isocyanate-reactive component, for example, such as a polyol, a polyamine, an epoxy-containing compound, and mixtures thereof.

The term "quasi-prepolymer," as used herein, refers to a subset of prepolymers in which the isocyanate content is at least about 13% of the weight of the prepolymer. Where prepolymers are mentioned herein, it should be understood that this includes prepolymers having an isocyanate content less than about 13% by weight and also includes quasi-prepolymers.

The term "viscosity index," as used herein, refers to the ratio of viscosities between two components. As should be understood by one of ordinary skill in the art, solid components generally do not have a measurable viscosity.

The term "substantially," as used herein referring to an amount or condition, means at least about 80%, preferably at least about 90%, more preferably at least about 95%, most preferably at least about 99% of the amount or condition.

The term "about," as used herein before a range of values, should be understood to modify either or both of the values in the range.

As used herein with regard to golf ball properties, the term "compression" refers to Atti compression, which is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. When the Atti Gauge is used to measure cores having a diameter of less than 1.680 inches, it should be understood that a metallic or other suitable shim is used to make the measured object 1.680 inches in diameter.

DETAILED DESCRIPTION OF THE INVENTION

This invention relates to a sulfur-containing composition for forming golf equipment, or components thereof, in particular for forming one or more layers of a golf ball, comprising the reaction product of four reactable components, such that at least one of the four reactable components contains a sulfur atom. The first reactable component comprises polyisocyanates, polyisothiocyanates and mixtures thereof; the second reactable component comprises polyols, polythiols and mixtures thereof; the third reactable component comprising epoxides, episulfides and mixtures thereof; and the fourth reactable component comprises amines, anilines and mixtures thereof. This invention also relates to a method of making a golf equipment or portion thereof, in particular for forming one or more layers of a golf ball, by a reaction injection molding process, comprising the steps of providing the four reactable components, mixing the reactable components together to form a reactive mixture, and injecting the reactive mixture into a cavity or mold having a desired shape within a time sufficient to avoid substantial gelation or solidification. In addition, this invention also relates to using castable molding process and other methods to form one or more layers of a golf ball.

Polyisocyanates and polyisothiocyantes in the first reactable component react with long-chain or short-chain polyols and polythiols in the second reactable component, resulting in polyurethanes, polythiourethanes, and polydithiourethanes according to the following reaction schemes:

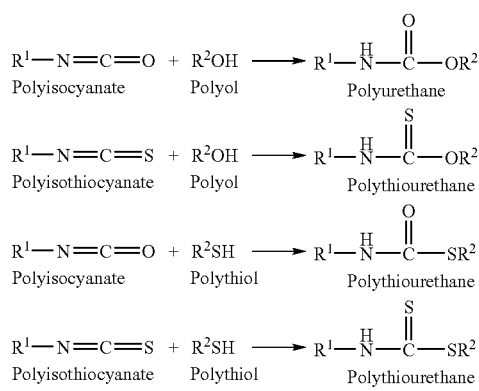

Polyisocyanates and polyisothiocyantes in the first reactable component react with epoxides and episulfides in the third reactable component, resulting in oxazolidin-2-one, oxazolidine-2-thione, thiazolidin-2-one, and thiazolidine-2-thione according to the following reaction schemes:

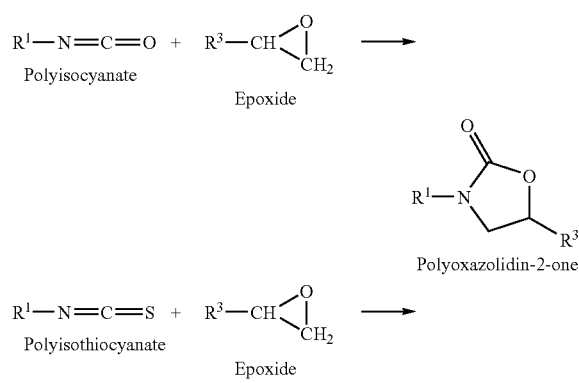

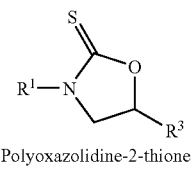

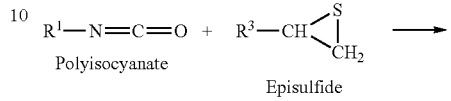

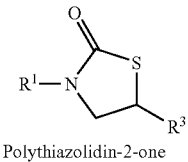

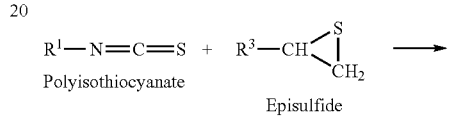

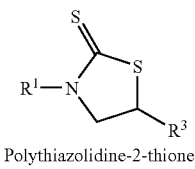

Polyisocyanates and polyisothiocyanates in the first reactable component react with amines and anilines in the fourth reactable component, resulting in polyureas and polythioureas according to the following reaction schemes:

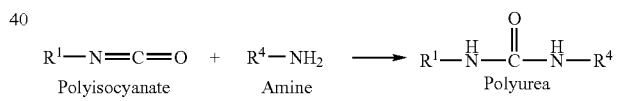

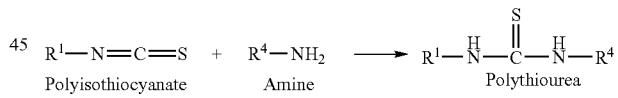

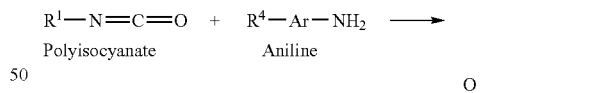

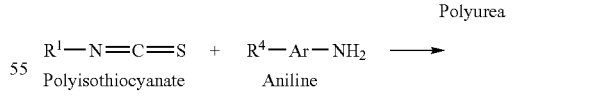

Polyols and polythiols in the second reactable component react with epoxides and episulfides in the third reactable component, resulting in alkoxy alcohols, thioalkoxy alcohols, alkoxy thiols, and thioalkoxy thiols according to the following reaction schemes:

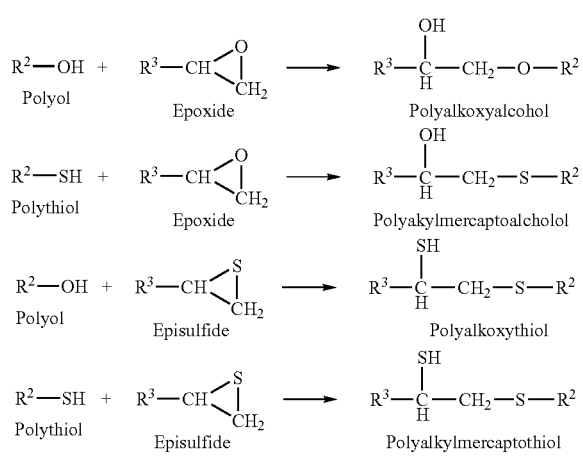

Epoxides and episulfides in the third reactable component react with amines and anilines in the fourth reactable component, resulting in alkylamino alcohols, alkylamino thiols, arylamino alcohols, and arylamino thiols according to the following reaction schemes:

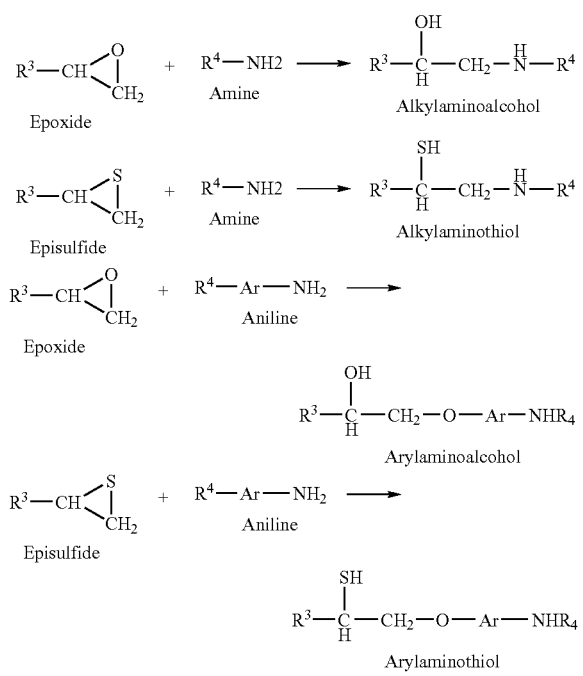

For the first reactable component, suitable polyisocyanates and polyisothiocyanates for use in the present invention can include but are not limited to polymeric and wherein R is $C_2$–$C_{20}$ linear, branched, cyclic aliphatic, aromatic and a combination thereof. Non-limiting examples of polyisocyanates can include but are not limited to aliphatic polyisocyanates, cycloaliphatic polyisocyanates wherein one or more of the isocyanato groups are attached directly to the cycloaliphatic ring, cycloaliphatic polyisocyanates wherein one or more of the isocyanato groups are not attached directly to the cycloaliphatic ring, aromatic polyisocyanates wherein one or more of the isocyanato groups are attached directly to the aromatic ring, and aromatic polyisocyanates wherein one or more of the isocyanato groups are not attached directly to the aromatic ring.

Similarly, non-limiting examples of polyisothiocyanates can include but are not limited to aliphatic polyisothiocyanates, cycloaliphatic polyisothiocyanates wherein one or more of the isothiocyanato groups are attached directly to the cycloaliphatic ring, cycloaliphatic polyisothiocyanates wherein one or more of the isothiocyanato groups are not attached directly to the cycloaliphatic ring, aromatic polyisothiocyanates wherein one or more of the isothiocyanato groups are attached directly to the aromatic ring, and aromatic polyisothiocyanates wherein one or more of the isothiocyanato groups are not attached directly to the aromatic ring.

The number average molecular weight of the polyisocyanates and the polyisothiocyanates can vary widely. In alternative non-limiting embodiments, the number average molecular (Mn) can be at least 100, or at least 150, or less than 15,000, or less than 5000. The number average molecular weight can be determined using known methods. In a non-limiting embodiment, the Mn can be determined by gel permeation chromatography (GPC) using polystyrene standards.

In a non-limiting embodiment of the present invention, the polyisocyanates can include but is not limited to aliphatic or cycloaliphatic diisocyanates, aromatic diisocyanates, cyclic dimers and cyclic trimers thereof, and mixtures thereof. Non-limiting examples of suitable polyisocyanates can include but are not limited to Desmodur N 3300 (hexamethylene diisocyanate trimer) which is commercially available from Bayer; Desmodur N 3400 (60% hexamethylene diisocyanate dimer and 40% hexamethylene diisocyanate trimer).

In a non-limiting embodiment, the polyisocyanate can include dicyclohexylmethane diisocyanate and isomeric mixtures thereof. As used herein and the claims, the term "isomeric mixtures" refers to a mixture of the cis—cis, trans—trans, and cis-trans isomers of the polyisocyanate. Non-limiting examples of isomeric mixtures for use in the present invention can include the trans—trans isomer of 4,4'-methylenebis(cyclohexyl isocyanate), hereinafter referred to as PICM (paraisocyanato cyclohexylmethane), the cis-trans isomer of PICM, the cis—cis isomer of PICM, and mixtures thereof.

In one non-limiting embodiment, three suitable isomers of 4,4'-methylenebis(cyclohexyl isocyanate) for use in the present invention are shown below.

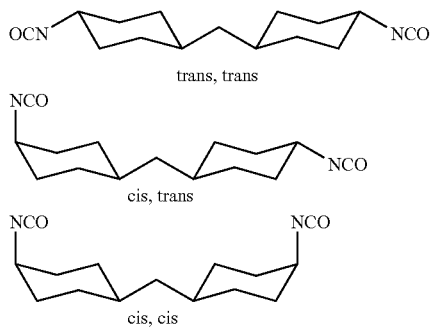

In one non-limiting embodiment, the PICM used in this invention can be prepared by phosgenating the 4,4'-methylenebis(cyclohexyl amine) (PACM) by procedures well known in the art such as the procedures disclosed in U.S.

Pat. Nos. 2,644,007 and 2,680,127, which are incorporated herein by reference. The PACM isomer mixtures, upon phosgenation, can produce PICM in a liquid phase, a partially liquid phase, or a solid phase at room temperature. The PACM isomer mixtures can be obtained by the hydrogenation of methylenedianiline and/or by fractional crystallization of PACM isomer mixtures in the presence of water and alcohols such as methanol and ethanol.

In a non-limiting embodiment, the isomeric mixture can contain from 10–100% of the trans,trans isomer of 4,4'-methylenebis(cyclohexyl isocyanate) (PICM).

Additional aliphatic and cycloaliphatic diisocyanates that can be used in alternate non-limiting embodiments of the present invention include 3-isocyanato-methyl-3,5,5-trimethylcyclohexyl-isocyanate ("IPDI") which is commercially available from Arco Chemical, and meta-tetramethylxylene diisocyanate (1,3-bis(1-isocyanato-1-methylethyl)--benzene) which is commercially available from Cytec Industries Inc. under the tradename TMXDI® (Meta) Aliphatic Isocyanate.

The terms aliphatic and cycloaliphatic diisocyanates refer to 6 to 100 carbon atoms linked in a straight chain or cyclized having two diisocyanate reactive end groups. In a non-limiting embodiment of the present invention, the aliphatic and cycloaliphatic diisocyanates for use in the present invention can include TMXDI and compounds of the formula R—(NCO)$_2$ wherein R represents an aliphatic group or a cycloaliphatic group.

Additional non-limiting examples of aliphatic polyisocyanates can include ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexane diisocyanate, decamethylene diisocyanate, 2,4,4,-trimethylhexamethylene diisocyanate, 1,6,11-undecanetriisocyanate, 1,3,6-hexamethylene triisocyanate, 1,8-diisocyanato-4-(isocyanatomethyl)o-ctane, 2,5,7-trimethyl-1,8-diisocyanato-5-(isocyanatomethyl)octane, bis(isocyanatoethyl)-carbonate, bis(isocyanatoethyl)ether, 2-isocyanatopropyl-2,6-diisocyanatohexanoate, lysinediisocyanate methyl ester and lysinetriisocyanate methyl ester.

Non-limiting examples of ethylenically unsaturated polyisocyanates can include butene diisocyanate and 1,3-butadiene-1,4-diisocyanate. Non-limiting examples of alicyclic polyisocyanates can include isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane,2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane and 2-isocyanatomethyl-2-(3-isocyanatopropyl)-6-(2-isocyanatoethyl)-bicyclo[2.2.1]-heptane.

Non-limiting examples of aromatic polyisocyanates wherein the isocyanate groups are not bonded directly to the aromatic ring can include bis(isocyanatoethyl)benzene, α,α,α',α'-tetramethylxylene diisocyanate, 1,3-bis(1-isocyanato-1-methylethyl)benzene, bis(isocyanatobutyl)benzene, bis(isocyanatomethyl)naphthalene, bis(isocyanatomethyl)diphenyl ether, bis(isocyanatoethyl) phthalate, mesitylene triisocyanate and 2,5-di(isocyanatomethyl)furan. Aromatic polyisocyanates having isocyanate groups bonded directly to the aromatic ring can include but are not limited to phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, ortho-toluidine diisocyanate, ortho-tolylidine diisocyanate, ortho-tolylene diisocyanate, 4,4'-diphenylmethane diisocyanate, bis(3-methyl-4-isocyanatophenyl)methan-e, bis(isocyanatophenyl)ethylene, 3,3'-dimethoxy-biphenyl-4,4'-diisocyanate, triphenylmethane triisocyanate, polymeric 4,4'-diphenylmethane diisocyanate, naphthalene triisocyanate, diphenylmethane-2,4,4'-triisocyanate, 4-methyldiphenylmethane-3,5,2',4',6'-pentaisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate and dichlorocarbazole diisocyanate.

Further non-limiting examples of aliphatic and cycloaliphatic diisocyanates that can be used in the present invention include 3-isocyanato-methyl-3,5,5-trimethyl cyclohexyl-isocyanate ("IPDI") which is commercially available from Arco Chemical, and meta-tetramethylxylene diisocyanate (1,3-bis(1-isocyanato-1-methylethyl)-benzene) which is commercially available from Cytec Industries Inc. under the tradename TMXDI® (Meta) Aliphatic Isocyanate.

In a non-limiting embodiment of the present invention, the aliphatic and cycloaliphatic diisocyanates for use in the present invention can include TMXDI and compounds of the formula R(NCO)$_2$, wherein R represents an aliphatic group or a cycloaliphatic group.

Non-limiting examples of aliphatic polyisocyanates containing sulfide or disulfide linkages can include thiodiethyl diisocyanate, thiodipropyl diisocyanate, dithiodihexyl diisocyanate, dithiodimethyl diisocyanate, dithiodiethyl diisocyanate, dithiodipropyl diisocyanate and dicyclohexylsulfide-4,4'-di-isocyanate.

Non-limiting examples of aromatic polyisocyanates containing sulfide or disulfide linkages can include diphenylsulfide-2,4'-diisocyanate, diphenylsulfide-4,4'-diisocyanate, 3,3'-dimethoxy-4,4'-diisocyanatodibenzyl thioether, bis(4-isocyanatomethylbenzene)-sulfide, diphenyldisulfide-4,4'-diisocyanate, 2,2'-dimethyldiphenyldisulfide-5,5'-diisocyanate, 3,3'-dimethyldiphenyldisulfide-5,5'-diisocyanate, 3,3'-dimethyldiphenyldisulfide-6,6'-diisocyanate, 4,4'-dimethyldiphenyldisulfide-5,5'-diisocyanate, 3,3'-dimethoxydiphenyldisulfide-4,4'-diisocyanate and 4,4'-dimethoxydiphenyldisulfide-3,3'-diisocyanate.

In a further non-limiting embodiment, a polyisocyanate of the following general formula can be used in this invention:

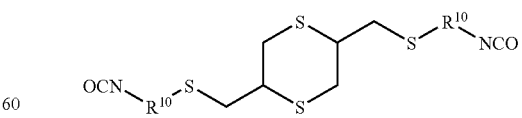

wherein $R^{10}$ and $R^{11}$ are each independently $C_1$ to $C_3$ alkyl.

Non-limiting examples of aliphatic polyisocyantes containing sulfone linkages can include dimethylsulfone diisocyanate, [Additional examples.]

Non-limiting examples of aromatic polyisocyanates containing sulfone linkages can include diphenylsulfone-4,4'-diisocyanate, diphenylsulfone-3,3'-diisocyanate, benzidinesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatodibenzylsulfone, 4,4'-dimethyldiphenylsulfone-3,3'-diisocyanate, 4,4'-di-tert-butyl-diphenylsulfone-3,3'-diisocyanate and 4,4'-dichlorodiphenylsulfone-3,3'-diisocyanate.

Non-limiting examples of aromatic sulfonic amide-type polyisocyanates for use in the present invention can include 4-methyl-3-isocyanato-benzene-sulfonylanilide-3'-methyl-4'-isocyanate, dibenzenesulfonyl-ethylenediamine-4,4'-diisocyanate, 4,4'-methoxybenzenesulfonyl-ethylenediamine-3,3'-diisocyanate and 4-methyl-3-isocyanato-benzene-sulfonylanilide-4-ethyl-3'-isocyanate.

In alternative non-limiting embodiments, the polyisothiocyanates that can be used in the present invention include aliphatic polyisothiocyanates; alicyclic polyisothiocyanates, such as but not limited to cyclohexane diisothiocyanates; aromatic polyisothiocyanates wherein the isothiocyanate groups are not bonded directly to the aromatic ring, such as but not limited to α,α'-xylene diisothiocyanate; aromatic polyisothiocyanates wherein the isothiocyanate groups are bonded directly to the aromatic ring, such as but not limited to phenylene diisothiocyanate; heterocyclic polyisothiocyanates, such as but not limited to 2,4,6-triisothicyanato-1,3, 5-triazine and thiophene-2,5-diisothiocyanate; carbonyl polyisothiocyanates; aliphatic polyisothiocyanates containing sulfide linkages, such as but not limited to thiobis(3-isothiocyanatopropane); aromatic polyisothiocyanates containing sulfur atoms in addition to those of the isothiocyanate groups; halogenated, alkylated, alkoxylated, nitrated, carbodiimide modified, urea modified and biuret modified derivatives of these polyisothiocyanates; and dimerized and trimerized products of these polyisothiocyanates.

Non-limiting examples of aliphatic polyisothiocyanates include 1,2-diisothiocyanatoethane, 1,3-diisothiocyanatopropane, 1,4-diisothiocyanatobutane and 1,6-diisothiocyanatohexane.

Non-limiting examples of aromatic polyisothiocyanates having isothiocyanate groups bonded directly to the aromatic ring can include 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-diisothiocyanato-1,1'-biphenyl, 1,1'-methylenebis(4-isothiocyanatobenzene), 1,1'-methylenebis(4-isothiocyanato-2-methylbenzene), 1,1'-methylenebis(4-isothiocyanato-3-methylbenzene), 1,1'-(1,2-ethane-diyl)bis(4-isothiocyanatobenzene), 4,4'-diisothiocyanatobenzophenenone, 4,4'-diisothiocyanato-3,3'-dimethylbenzophenone, benzanilide-3,4'-diisothiocyanate, diphenylether-4,4'-diisoth-iocyanate and diphenylamine-4,4'-diisothiocyanate.

Suitable carbonyl polyisothiocyanates can include but are not limited to hexane-dioyl diisothiocyanate, nonaedioyl diisothiocyanate, carbonic diisothiocyanate, 1,3-benzenedicarbonyl diisothiocyante, 1,4-benzenedicarbonyl diisothiocyanate and (2,2'-bipyridine)-4,4'-dicarbonyl diisothiocyanate. Non-limiting examples of aromatic polyisothiocyanates containing sulfur atoms in addition to those of the isothiocyanate groups, can include 1-isothiocyanato-4-[(2-isothiocyanato)sulfonyl]benzene, thiobis(4-isothiocyanatobenzene), sulfonylbis(4-isothiocyanatobenzene), sulfinylbis(4-isothiocyanatobenzene), dithiobis(4-isothiocyanatobenzene), 4-isothiocyanato-1-[(4-isothiocyanatophenyl)-sulfonyl]-2-methoxybenzene, 4-methyl-3-isothicyanatobenzene-sulfonyl-4'-isothiocyanate phenyl ester and 4-methyl-3-isothiocyanatobenzene-sulfonylanilide-3'-methyl-4'-isothio-cyanate.

In a particular aspect of this invention, the first reactable component can also include but is not limited to polyisocyanates having at least two isocyanate groups, polyisothiocyanates having at least two isothiocyanate groups and mixtures thereof. Non-limiting examples suitable for the present invention include aliphatic polyisocyanates and polyisothiocyanates; ethylenically unsaturated polyisocyanates and polyisothiocyanates; alicyclic polyisocyanates and polyisothiocyanates; aromatic polyisocyanates and polyisothiocyanates wherein the isocyanate and isothiocyanate groups are not bonded directly to the aromatic ring, e.g., α,α'-xylene diisocyanate and α,α'-xylene diisothiocyanate; aromatic polyisocyanates and polyisothiocyanates wherein the isocyanate and isothiocyanate groups are bonded directly to the aromatic ring, e.g., benzene diisocyanate and benzene diisothiocyanate; aliphatic polyisocyanates and polyisothiocyanates containing sulfide or disulfide linkages; aromatic polyisocyanates and polyisothiocyanates containing sulfide or disulfide linkages; aromatic polyisocyanates and polyisothiocyanates containing sulfone linkages; sulfonic ester-type polyisocyanates and polyisothiocyanates, e.g., 4-methyl-3-isocyanatobenzenesulfonyl-4'-isocyanato-phenol ester; aromatic sulfonic amide-type polyisocyanates and polyisothiocyanates; sulfur-containing heterocyclic polyisocyanates and polyisothiocyanates, e.g., thiophene-2,5-diisocyanate; halogenated, alkylated, alkoxylated, nitrated, carbodiimide modified, urea modified and biuret modified derivatives of polycyanates thereof; and dimerized and trimerized products of polycyanates thereof.

Non-limiting examples of polyisocyanates and polyisothiocyanates having isocyanate and isothiocyanate groups can include aliphatic, alicyclic, aromatic, heterocyclic, or contain sulfur atoms in addition to those of the isothiocyanate groups. Non-limiting examples of such polycyanates include 1-isocyanato-3-isothicyanatopropane, 1-isocyanato-5-isothiocyanatopentane, 1-isocyanato-6-isothiocyanatohexane, isocyanatocarbonyl isothiocyanate, 1-isocyanato-4-isothiocyanatocyclohexane, 1-isocyanato-4-isothiocyanatobenzene, 4-methyl-3-isocyanato-1-isothiocyanatobenzene, 2-isocyanato-4,6-diisothiocyanato-1,3,5-triazine, 4-isocyanato-4'-isothiocyanato-diphenyl sulfide and 2-isocyanato-2'-isothiocyanatodiethyl disulfide.

For the second reactable component, compounds with a hydrogen-containing material chosen from polyols, polythiols and materials containing both hydroxyl and thiol functional groups with react with polyisocyanates and polyisothiocyanates in the first reactable component to form the polyurethanes, polythiourethanes, polydithiourethanes, or combinations thereof in the present invention.

Suitable hydroxyl-containing materials for use in the present invention can include but are not limited to polyether polyols, polyester polyols, polycaprolactone polyols, polycarbonate polyols, and mixtures thereof.

Polyether polyols and methods for their preparation are known to those skilled in the art. Many polyether polyols of various types and molecular weight are commercially available from various manufacturers. Non-limiting examples of polyether polyols can include but are not limited to polyoxyalkylene polyols, and polyalkoxylated polyols. Polyoxyalkylene polyols can be prepared in accordance with known methods. In a non-limiting embodiment, a polyoxyalkylene polyol can be prepared by condensing an alkylene oxide, or a mixture of alkylene oxides, using acid-or base-catalyzed addition with a polyhydric initiator or a mixture of polyhydric initiators, such as but not limited to ethylene glycol, propylene glycol, glycerol, and sorbitol. Non-limiting examples of alkylene oxides can include ethylene oxide, propylene oxide, butylene oxide, amylene oxide, aralkylene oxides, such as but not limited to styrene oxide, mixtures of ethylene oxide and propylene oxide. In a further non-limiting embodiment, polyoxyalkylene polyols can be prepared with mixtures of alkylene oxide using random or step-wise oxyalkylation. Non-limiting examples of such polyoxyalkylene polyols include polyoxyethylene, such as but not limited to polyethylene glycol, polyoxypropylene, such as but not limited to polypropylene glycol.

In a non-limiting embodiment, polyalkoxylated polyols can be represent by the following general formula:

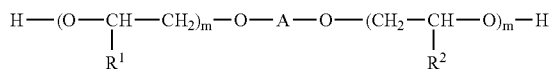

wherein m and n can each be a positive integer, the sum of m and n being from 5 to 70; $R^1$ and $R^2$ are each hydrogen, methyl or ethyl; and A is a divalent linking group such as a straight or branched chain alkylene which can contain from 1 to 8 carbon atoms, phenylene, and $C_1$ to $C_9$ alkyl-substituted phenylene. The chosen values of m and n can, in combination with the chosen divalent linking group, determine the molecular weight of the polyol. Polyalkoxylated polyols can be prepared by methods that are known in the art. In a non-limiting embodiment, a polyol such as 4,4'-isopropylidenediphenol can be reacted with an oxirane-containing material such as but not limited to ethylene oxide, propylene oxide and butylene oxide, to form what is commonly referred to as an ethoxylated, propoxylated or butoxylated polyol having hydroxy functionality. Non-limiting examples of polyols suitable for use in preparing polyalkoxylate polyols can include those polyols described in U.S. Pat. No. 6,187,444 B1 at column 10, lines 1–20, which disclosure is incorporated herein by reference.

Polyether polyols can include the generally known poly(oxytetramethylene) diols prepared by the polymerization of tetrahydrofuran in the presence of Lewis acid catalysts such as but not limited to boron trifluoride, tin (IV) chloride and sulfonyl chloride. Also included are the polyethers prepared by the copolymerization of cyclic ethers such as but not limited to ethylene oxide, propylene oxide, trimethylene oxide, and tetrahydrofuran with aliphatic diols such as but not limited to ethylene glycol, 1,3-butanediol, 1,4-butanediol, diethylene glycol, dipropylene glycol, 1,2-propylene glycol and 1,3-propylene glycol. Compatible mixtures of polyether polyols can also be used. As used herein, "compatible" means that the polyols are mutually soluble in each other so as to form a single phase.

Polycarbonate polyols are known in the art and are commercially available such as Ravecarb™ 107 (Enichem S.p.A.). In a non-limiting embodiment, the polycarbonate polyol can be produced by reacting an organic glycol such as a diol, such as those described hereinafter and in connection with the glycol component of the polyureaurethane, and a dialkyl carbonate, such as described in U.S. Pat. No. 4,160,853. In a non-limiting embodiment, the polyol can include polyhexamethyl carbonate such as H—(O—C(=O)—O—(CH$_2$)$_6$)$_n$—OH, wherein n is an integer from 4 to 24, or from 4 to 10, or from 5 to 7.

In a non-limiting embodiment, the glycol material can comprise low molecular weight polyols such as polyols having a molecular weight of less than 500, and compatible mixtures thereof. As used herein, "compatible" means that the glycols are mutually soluble in each other so as to form a single phase. Non-limiting examples of these polyols can include but are not limited to low molecular weight diols and triols. In a further non-limiting embodiment, the amount of triol chosen is such to avoid a high degree of cross-linking in the polyurethane. A high degree of cross-linking can result in a thermoset polyurethane that is not formable by moderate heat and pressure. The organic glycol typically contains from 2 to 16, or from 2 to 6, or from 2 to 10, carbon atoms. Non-limiting examples of such glycols can include but are not limited to ethylene glycol, propylene glycol, diethylene glycol, triethylene glycol, tetraethylene glycol, dipropylene glycol, tripropylene glycol, 1,2-, 1,3- and 1,4-butanediol, 2,2,4-trimethyl-1,3-pentanediol, 2-methyl-1,3-pentanediol, 1,3-, 2,4- and 1,5-pentanediol, 2,5- and 1,6-hexanediol, 2,4-heptanediol, 2-ethyl-1,3-hexanediol, 2,2-dimethyl-1,3-propanediol, 1,8-octanediol, 1,9-nonanediol, 1,10-decanediol, 1,4-cyclohexanediol, 1,4-cyclohexanedimethanol, 1,2-bis(hydroxyethyl)-cyclohexane, glycerin, tetramethylolmethane, such as but not limited to pentaerythritol, trimethylolethane and trimethylolpropane; and isomers thereof.

In alternate non-limiting embodiments, the hydroxyl-containing material can have a weight average molecular weight of at least 200, or at least 1000, or at least 2000. In alternate non-limiting embodiments, the hydroxyl-containing material can have a weight average molecular weight of less than 10000, or less than 15000, or less than 20000, or less than 32000.

In a non-limiting embodiment, the polyether-containing polyol material for use in the present invention can include teresters produced from at least one low molecular weight dicarboxylic acid, such as adipic acid.

Polyether glycols for use in the present invention can include but are not limited to polytetramethylene ether glycol.

In a non-limiting embodiment, the hydrogen-containing material can comprise block polymers including blocks of ethylene oxide-propylene oxide and/or ethylene oxide-butylene oxide. In a non-limiting embodiment, the hydrogen-containing material can comprise a block polymer of the following chemical formula:

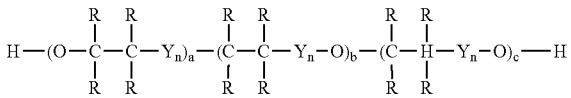

wherein R can represent hydrogen or $C_1$–$C_6$ alkyl; Y can represent $CH_2$; n can be an integer from 0 to 6; a, b, and c can each be an integer from 0 to 300, wherein a, b and c are chosen such that the weight average molecular weight of the polyol does not exceed 32,000.

In a further non-limiting embodiment, Pluronic R, Pluronic L62D, Tetronic R and Tetronic, which are commercially available from BASF, can be used as the hydrogen-containing material in the present invention.

Non-limiting examples of suitable polyols for use in the present invention include straight or branched chain alkane polyols, such as but not limited to 1,2-ethanediol, 1,3-propanediol, 1,2-propanediol, 1,4-butanediol, 1,3-butanediol, glycerol, neopentyl glycol, trimethylolethane, trimethylolpropane, di-trimethylolpropane, erythritol, pentaerythritol and di-pentaerythritol; polyalkylene glycols, such as but not limited to diethylene glycol, dipropylene glycol and higher polyalkylene glycols such as but not limited to polyethylene glycols which can have number average molecular weights of from 200 to 2,000 grams/mole; cyclic alkane polyols, such as but not limited to cyclopentanediol, cyclohexanediol, cyclohexanetriol, cyclohexanedimethanol, hydroxypropylcyclohexanol and cyclohexanediethanol; aromatic polyols, such as but not limited to dihydroxybenzene, benzenetriol, hydroxybenzyl alcohol and dihydroxytoluene; bisphenols, such as, 4,4'-isopropylidenediphenol; 4,4'-oxybisphenol, 4,4'-dihydroxybenzophenone, 4,4'-thiobisphenol, phenolphthlalein, bis(4-hydroxyphenyl)methane, 4,4'-(1,2-ethenediyl)bisph-enol and 4,4'-sulfonylbisphenol; halogenated bisphenols, such as but not limited to 4,4'-isopropylidenebis(2,6-dibromophenol), 4,4'-isopropylidenebis(2,6-dichlorophenol) and 4,4'-isopropylidenebis(2,3-,5,6-tetrachlorophenol); alkoxylated bisphenols, such as but not limited to alkoxylated 4,4'-isopropylidenediphenol which can have from 1 to 70 alkoxy groups, for example, ethoxy, propoxy, α-butoxy and β-butoxy groups; and biscyclohexanols, which can be prepared by hydrogenating the corresponding bisphenols, such as but not limited to 4,4'-isopropylidene-biscyclohexanol, 4,4'-oxybiscyclohexanol, 4,4'-thiobiscyclohexanol and bis(4-hydroxycyclohexanol)methane; polyurethane polyols, polyester polyols, polyether polyols, poly vinyl alcohols, polymers containing hydroxy functional acrylates, polymers containing hydroxy functional methacrylates, and polymers containing allyl alcohols.

In a non-limiting embodiment, the polyol can be chosen from multifunctional polyols, including but not limited to trimethylopropane, ethoxylated trimethylolpropane, pentaerythritol.

In a further non-limiting embodiment, the polyol can be a polyurethane prepolymer having two or more hydroxy functional groups. Such polyurethane prepolymers can be prepared from any of the above-listed polyols and aforementioned polyisocyanates. In a non-limiting embodiment, the hydroxyl to isocyanate molar equivalent ratio can be chosen such that essentially no free isocyanate groups are produced in preparing the polyurethane prepolymer. In the present invention, the equivalent ratio of polyisocyanate to polyol present in the polyether-containing polyurethane prepolymer can be an amount of from 2.0 to less than 4.5 isocynate/1.0 hydroxyl.

In alternative non-limiting embodiments, the polyurethane prepolymer can have a number average molecular weight (Mn) of less than 50,000, or less than 20,000, or less than 10,000 grams/mole. The Mn can be determined using a variety of known methods. In a non-limiting embodiment, the Mn can be determined by gel permeation chromatography (GPC) using polystyrene standards.

In a non-limiting embodiment, the polythiols for use in the present invention can have at least two thiol groups. Non-limiting examples of suitable polythiols can include but are not limited to aliphatic polythiols, cycloaliphatic polythiols, aromatic polythiols, heterocyclic polythiols, polymeric polythiols and mixtures thereof. The hydrogen-containing material can have linkages including but not limited to ether linkages (—O—), sulfide linkages (—S—), polysulfide linkages (—S$_x$—, wherein x is at least 2, or from 2 to 4) and combinations of such linkages. As used herein and the claims, the terms "thiol," "thiol group," "mercapto" or "mercapto group" refer to an —SH group which is capable of forming a thiourethane linkage, (i.e., —NH—C(O)—S—) with an isocyanate group or a dithioruethane linkage (i.e., —NH—C(=S)—S—) with an isothiocyanate group.

Non-limiting examples of suitable polythiols can include but are not limited to 2,5-dimercaptomethyl-1,4-dithiane, 2,2'-thiodiethanethiol, pentaerythritol tetrakis(3-mercaptopropionate), pentaerythritol tetrakis(2-mercaptoacetate), trimethylolpropane tris(3-mercaptopropionate-), trimethylolpropane tris(2-mercaptoacetate), 4-mercaptomethyl-3,6-dithia--1,8-octanedithiol, 4-tert-butyl-1,2-benzenedithiol, 4,4'-thiodibenzenethiol, benzenedithiol, ethylene glycol di(2-mercaptoacetate), ethylene glycol di(3-mercaptopropionate), poly(ethylene glycol) di(2-mercaptoacetate) and poly(ethylene glycol) di(3-mercaptopropionate), and mixtures thereof.

The polythiol can be chosen from materials represented by the following general formula:

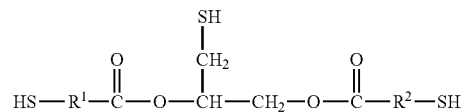

wherein R$^1$ and R$^2$ can each be independently chosen from straight or branched chain alkylene, cyclic alkylene, phenylene and C$_1$–C$_9$ alkyl substituted phenylene. Non-limiting examples of straight or branched chain alkylene can include but are not limited to methylene, ethylene, 1,3-propylene, 1,2-propylene, 1,4-butylene, 1,2-butylene, pentylene, hexylene, heptylene, octylene, nonylene, decylene, undecylene, octadecylene and icosylene. Non-limiting examples of cyclic alkylenes can include but are not limited to cyclopentylene, cyclohexylene, cycloheptylene, cyclooctylene, and alkyl-substituted derivatives thereof. In a non-limiting embodiment, the divalent linking groups R$^1$ and R$^2$ can be chosen from phenylene and alkyl-substituted phenylene, such as methyl, ethyl, propyl, isopropyl and nonyl substituted phenylene. In a further non-limiting embodiment, R$^1$ and R$^2$ are each methylene or ethylene.

The polythiol represented by general formula shown above can be prepared by any known method. In a non-limiting embodiment, the polythiol of formula can be prepared from an esterification or transesterification reaction between 3-mercapto-1,2-propanediol (Chemical Abstract Service (CAS) Registry No. 96-27-5) and a thiol functional carboxylic acid or carboxylic acid ester in the presence of a strong acid catalyst, such as but not limited to methane sulfonic acid, with the concurrent removal of water or alcohol from the reaction mixture. A non-limiting example of a polythiol of formula II includes a structure wherein R$^1$ and R$^2$ are each methylene.

In a non-limiting embodiment, the polythiol represented by general formula II can be thioglycerol bis(2-mercaptoacetate). As used herein and the claims, the term "thioglycerol bis(2-mercaptoacetate)" refers to any related co-product oligomeric species and polythiol monomer compositions containing residual starting materials. In a non-limiting embodiment, oxidative coupling of thiol groups can occur when washing the reaction mixture resulting from the esterification of 3-mercapto-1,2-propanediol and a thiol functional carboxylic acid, such as but not limited to 2-mercaptoacetic acid, with excess base, such as but not limited to aqueous ammonia. Such an oxidative coupling can result in the formation of oligomeric polythiol species having disulfide linkages, such as but not limited to —S—S— linkages.

Suitable polythiols for use in the present invention can include but are not limited to polythiol oligomers having disulfide linkages, which can be prepared from the reaction of a polythiol having at least two thiol groups and sulfur in the presence of a basic catalyst. In a non-limiting embodiment, the molar equivalent ratio of polythiol monomer to sulfur can be from m to (m−1) wherein m can represent an integer from 2 to 21. The polythiol can be chosen from the above-mentioned examples, such as but not limited to 2,5-dimercaptomethyl-1,4-dithiane. In alternative non-limiting embodiments, the sulfur can be in the form of crystalline, colloidal, powder and sublimed sulfur, and can have a purity of at least 95 percent or at least 98 percent.

Non-limiting examples of co-product oligomeric species can include materials represented by the following general formula:

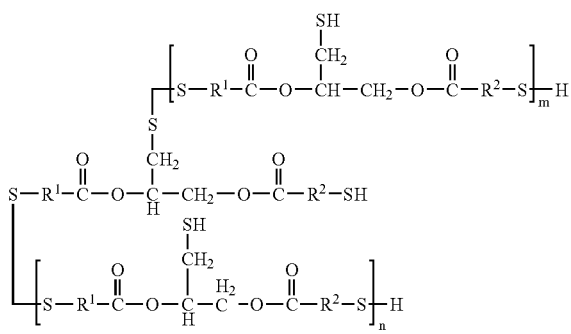

wherein $R^1$ and $R^2$ can be as described above, n and m can be independently an integer from 0 to 21 and (n+m) can be at least 1.

In another non-limiting embodiment, the polythiol oligomer can have disulfide linkages and can include materials represented by the following general formula,

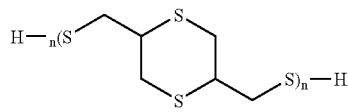

wherein n can represent an integer from 1 to 21. In a non-limiting embodiment, the polythiol oligomer represented by general formula can be prepared by the reaction of 2,5-dimeracaptomethyl-1,4-dithiane with sulfur in the presence of a basic catalyst, as described previously herein.

Non-limiting examples of suitable materials having both hydroxyl and thiol groups can include but are not limited to 2-mercaptoethanol, 3-mercapto-1,2-propanediol, glycerin bis(2-mercaptoacetate), glycerin bis(3-mercaptopropionate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1-propanol, 1,2-dimercapto-1,3-butanediol, trimethylolpropane bis(2-mercaptoacetate), trimethylolpropane bis(3-mercaptopropionate), pentaerythritol mono(2-mercaptoacetate), pentaerythritol bis(2-mercaptoacetate), pentaerythritol tris(2-mercaptoacetate), pentaerythritol mono(3-mercaptopropionate), pentaerythritol bis(3-mercaptopropionate), pentaerythritol tris(3-mercaptopropionate), hydroxymethyl-tris(mercaptoethylthiomethyl)methane, 1-hydroxyethylthio-3-mercaptoethylthiobenzene, 4-hydroxy-4'-mercaptodiphenylsulfone, dihydroxyethyl sulfide mono(3-mercaptopropionate and hydroxyethylthiomethyl-tris(mercaptoethylthio)methane.

In alternative non-limiting embodiments, the hydrogen-containing material for use in the present invention can be chosen from polyether glycols and polyester glycols having a weight average molecular weight of at least 200, or at least 300, or at least 750; or no greater than 1,500, or no greater than 2,500, or no greater than 4,000.

Non-limiting examples of polyester polyols are those polyols that have the structure represented by the following formula:

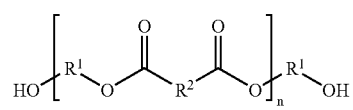

where $R_1$ and $R_2$ are straight or branched hydrocarbon chains, each containing from 1 to about 20 carbon atoms, and n ranges from 1 to about 25. Suitable polyester polyols include, but are not limited to, polyethylene adipate glycol, polypropylene adipate glycol, polybutylene adipate glycol, poly(ethylene adipate-propylene adipate)glycol, poly(hexamethylene adipate)glycol, and mixtures and copolymers thereof. The hydrocarbon chain can have saturated or unsaturated bonds, or substituted or unsubstituted aromatic and cyclic groups.

In an alternate preferred embodiment, the polyester polyol can include a polycyclic ester polyol, for example, such as a polycaprolactone polyol. When polycaprolactone polyols are included in the materials of the invention, preferably those polyols that have the structure represented by the following formula:

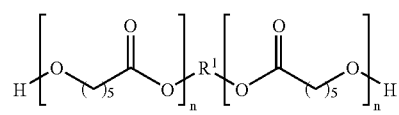

where $R^1$ is preferably a straight chain or branched hydrocarbon chain containing from 1 to about 20 carbon atoms, and where n is the chain length and ranges from 1 to about 20. Suitable polycaprolactone polyols include, but are not limited to, 1,6-hexanediol-initiated polycaprolactone, diethylene glycol-initiated polycaprolactone, trimethylol propane-initiated polycaprolactone, neopentyl glycol-initiated polycaprolactone, 1,4-butanediol-initiated polycaprolactone, PTMEG-initiated polycaprolactone, and mixtures thereof. The hydrocarbon chain can have saturated or unsaturated bonds, or substituted or unsubstituted aromatic and cyclic groups.

Non-limiting samples of polycarbonate polyols are those polyols that have the structure represented by the following formula:

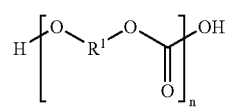

where $R_1$ can include a hydrocarbon chain, which may have saturated or unsaturated bonds or substituted or unsubstituted aromatic or cyclic groups (e.g., in one preferred embodiment, $R_1$ includes predominantly bisphenol A units -(p-$C_6H_4$)—C($CH_3$)$_2$(P—$C_6H_4$)— or derivatives thereof), and where the chain length, n, ranges from 1 to about 20. Suitable polycarbonates include, but are not limited to, poly(phthalate carbonate)glycol, poly(hexamethylene carbonate)glycol, polycarbonate glycols containing bisphenol A, or mixtures or copolymers thereof.

Other suitable polyols have the following general chemical structure:

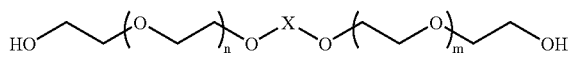

where n and m each separately have values of 0, 1, 2, or 3, and where X is o-phenylene, m-phenylene, p-phenylene, 1,2-cyclohexyl, 1,3-cyclohexyl, or 1,4-cyclohexyl, or mixtures thereof. Preferably, n and m each separately have values of 0, 1, or 2, and more preferably, 1 or 2.

For the third reactable component, suitable epoxides and episulfides are materials that can have at least one, or two, or more epoxide and episulfide functional groups. In a non-limiting embodiment, the epoxide- and episulfide-containing material can have two or more moieties represented by the following general formula:

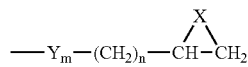

wherein X can be S or O; Y can be $C_1$-$C_{10}$ alkyl, —O—, or —S—; m can be an integer from 0 to 2, and n can be an integer from 0 to 10. In a non-limiting embodiment, the numerical ratio of S is 50% or more, on the average, of the total of S and O constituting a three-membered ring.

Non-limiting examples of epoxides in the present invention have the general formula:

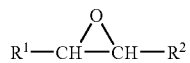

wherein $R^1$ and $R^2$ can be the same or different and each represent a hydrogen atom or an organic group including linear and branched chain alkyl, aryl, hydrocarbyloxy, and carbocyclic groups, and mixtures thereof. In a preferred embodiment, both $R^1$ and $R^2$ are generally not hydrogen atoms. As used herein, the phrase linear chain or branched chained alkyl groups of up to about 30 carbon atoms means any substituted or unsubstituted acyclic carbon-containing compounds. Examples of alkyl groups include lower alkyl are methyl, ethyl, n-propyl, iso-propyl, n-butyl, iso-butyl or tert-butyl. In addition, such alkyl group may also contain various substituents in which one or more hydrogen atoms have been replaced by a functional group. Functional groups include but are not limited to hydroxyl, amino, carboxyl, amide, ester, ether, halogen (fluorine, chlorine, bromine and iodine), siloxanes, and sulfonic amides to mention but a few. As used herein, substituted and unsubstituted carbocyclic groups of up to about 20 carbon atoms means cyclic carbon-containing compounds, including but not limited to cyclopentyl, cyclohexyl, and a combination thereof.

Non-limiting examples of epoxides for the present invention includes organic compounds having two epoxy groups as shown in the formula below:

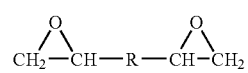

wherein R is defined as for $R^1$ and $R^2$ above.

A preferred example of an expoxide having two expoxy groups that can be of use in the present invention is (2,2-bis[4-(2'3'epoxy propoxy)phenyl]propane), commonly called the diglycidyl ether of bisphenol A (DGEBA) and having the following formula:

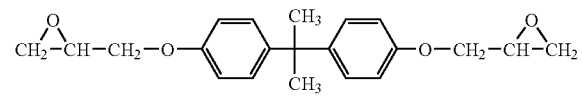

Other non-limiting examples of epoxide structurally related to DGEBA that may be of use in the present invention are the higher molecular weight homologs represented by the following formula:

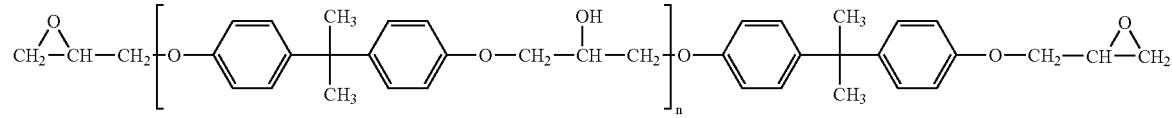

wherein typical values of n can be from 0.5 to about 2.5 and is about 0.15 for D.E.R. 331 epoxy resin (epoxy equivalent weight range of about 182 to 192 and viscosity of 11,000–14,000 cps). The low melting point solid resins begin at an "n" of about 2.5. In high melting point solid resins, n may be as high as 18.

Other non-limiting examples of epoxides having at least one epoxy group that can be used in this invention include the epoxy-novolac resins under the trade name D.E.N. (400 series), such as D.E.N. 431, D.E.N. 438 and D.E.N. 439, available from Dow Chemical Co. Further, low viscosity polyglycol epoxy resins under the trade name D.E.R. (700 series), including D.E.R. 732 and D.E.R. 736 may also be used. Also, the EPON™ class of epoxy resin available from SHELL can also be used in the golf equipment or methods according to the present invention.

Non-limiting examples of episulfides are those episulfides having two or more moieties represented by the formula (V) can be attached to an acyclic and/or cyclic skeleton. The acyclic skeleton can be branched or unbranched, and it can contain ether and/or sulfide linkages. In a non-limiting embodiment, the episulfides can be obtained by replacing the oxygen in an epoxy ring-containing acyclic material using sulfur, thiourea, thiocyanate, triphenylphosphine sulfide or other such reagents known in the art. In a further non-limiting embodiment, alkylsulfide-type episulfides can be obtained by reacting various known acyclic polythiols with epichlorohydrin in the presence of an alkali to obtain an alkylsulfide-type epoxy material; and then replacing the oxygen in the epoxy ring as described above.

In alternate non-limiting embodiments, the cyclic skeleton of the episulfides can include the following variations:

(a) an episulfide wherein the cyclic skeleton can be an alicyclic skeleton;

(b) an episulfide wherein the cyclic skeleton can be an aromatic skeleton; and (c) an episulfide wherein the cyclic skeleton can be a heterocyclic skeleton including a sulfur atom as a heteroatom.

In further non-limiting embodiments, each of the above episulfide can contain a linkage of a sulfide, an ether, a sulfone, a ketone, and/or an ester.

Non-limiting examples of suitable episulfides having an alicyclic skeleton can include but are not limited to 1,3- and 1,4-bis(β-epithiopropylthio)cyclohexane, 1,3- and 1,4-bis(β-epithiopropylthiomethyl)cyclohexane, bis[4-(β-epithiopropylthio)cyclohexyl]methane, 2,2-bis[4-(β-epithiopropylthio)cyclohexyl]propane, bis[4-(β-epithiopropylthio)cyclohexyl]sulfide, 4-vinyl-1-cyclohexene diepisulfide, 4-epithioethyl-1-cyclohexene sulfide, 4-epoxy-1,2-cyclohexene sulfide, 2,5-bis(β-epithiopropylthio)-1,4-dithiane, and 2,5-bis(β-epithiopropylthioethylthiomethyl)-1,4-dithiane.

Non-limiting examples of suitable episulfides having an aromatic skeleton can include but are not limited to 1,3- and 1,4-bis(β-epithiopropylthio)benzene, 1,3- and 1,4-bis(β-epithiop-ropylthiomethyl)benzene, bis[4-(β-epithiopropylthio)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfone, and 4,4-bis(β-epithiopropylthio)biphenyl.

Non-limiting examples of suitable episulfides having a heterocyclic skeleton including the sulfur atom as the hetero-atom can include but are not limited to the materials represented by the following general formulas:

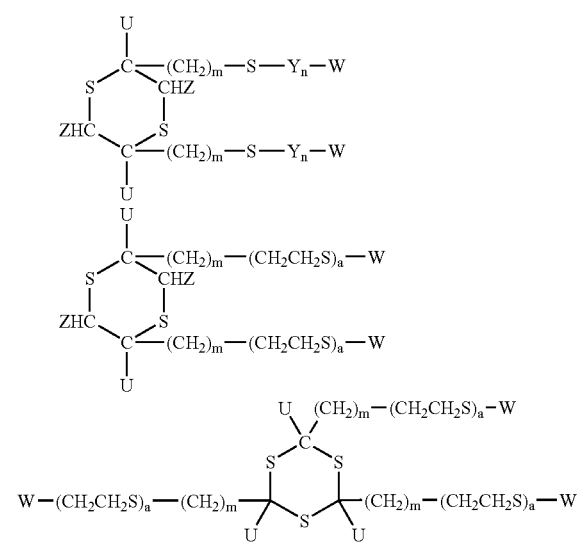

wherein m can be an integer from 1 to 5; n can be an integer from 0 to 4; a can be an integer from 0 to 5; U can be a hydrogen atom or an alkyl group having 1 to 5 carbon atoms; Y can be —(CH$_2$CH$_2$S)—; Z can be chosen from a hydrogen atom, an alkyl group having 1 to 5 carbon atoms or —(CH$_2$)$_m$SY$_n$W; W can be an epithiopropyl group represented by the following formula:

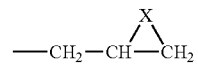

wherein X can be O or S.

Additional non-limiting examples of suitable episulfides include but are not limited to 2,5-bis(β-epithiopropylthiomethyl)-1,4-dithiane; 2,5-bis(β-epithiopropylthioethylthiomethyl)-1,4-dithiane; 2,5-bis(β-epithiopropylthioethyl)-1,4-dithiane; 2,3,5-tri(β-epithiopropylthioethyl)-1,4-dithiane; 2,4,6-tris(β-epithiopropylmethyl)-1,3,5-trithiane; 2,4,6-tris(β-epithiopropylthioethyl)-1,3,5-trithiane; 2,4,6-tris(2-epithiopropylthiomethyl)-1,3,5-trithiane; 2,4,6-tris(β-epithiopropylthioethylthioethyl)-1,3,5-trithiane;

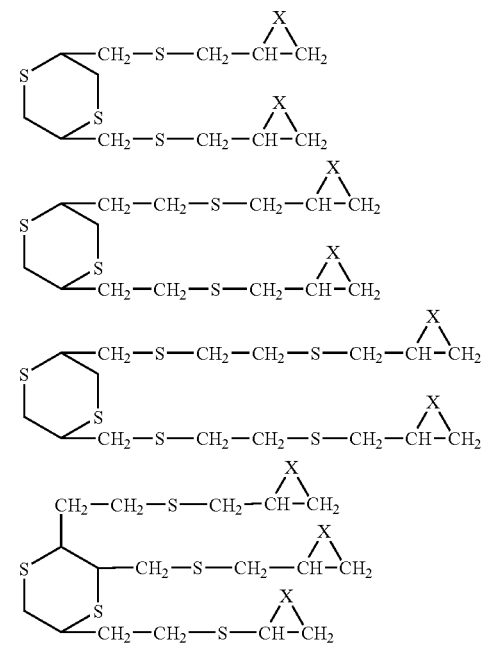

wherein X can be as defined above.

Further non-limiting examples of suitable episulfides that can be used in the present invention are described in U.S. Pat. Nos. 5,807,975 and 5,945,504, which are incorporated herein by reference in their entirety.

For the fourth reactable component, amines and anilines can be used as curing agents in this invention. Non-limiting examples of suitable amines and anilines can include but are not limited to aliphatic polyamines, cycloaliphatic polyamines, aromatic polyamines and mixtures thereof. In alternative non-limiting embodiments, the amines and anilines can have at least two functional groups chosen from primary amine (—NH$_2$), secondary amine (—NH—) and combinations thereof. In a further non-limiting embodiment, the amines can have at least two primary amine groups.

Suitable amines and anilines for use in the present invention are numerous and widely varied. Non-limiting examples include but are not limited to polyamines having more than one amino group per molecule, each amino group being independently selected from primary amino (—NH$_2$) and secondary amine (—NH—) groups. In alternate non-limiting embodiments, the amines and anilines can be chosen from aliphatic polyamines, cycloaliphatic polyamines, aromatic polyamines, and mixtures thereof. In a further non-limiting embodiment, the amino groups are all primary groups.

Suitable amines and anilines for use in the present invention can include but are not limited to materials having the following chemical formula:

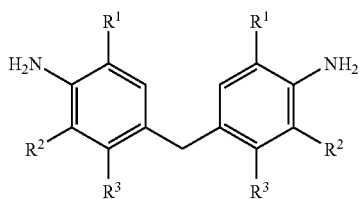

wherein $R^1$ and $R^2$ can each be independently chosen from methyl, ethyl, propyl, and isopropyl groups, and $R^3$ can be chosen from hydrogen and chlorine. Non-limiting examples of amines and anilines for use in the present invention include the following compounds manufactured by Lonza Ltd. (Basel, Switzerland):

LONZACURE® M-DIPA: $R^1$=C$_3$H$_7$; $R^2$=C$_3$H$_7$; $R^3$=H;
LONZACURE® M-DMA: $R^1$=CH$_3$; $R^2$=CH$_3$; $R^3$=H;
LONZACURE® M-MEA: $R^1$=CH$_3$; $R^2$=C$_2$H$_5$; $R^3$=H;
LONZACURE®μM-DEA: $R^1$=C$_2$H$_5$; $R^2$=C$_2$H$_5$; R=H;
LONZACURE® M-MIPA: $R^1$=CH$_3$; R $R^2$=C$_3$H$_7$; $R^3$=H; and
LONZACURE®.RTM. M-CDEA: $R^1$=C$_2$H$_5$; $R^2$=C$_2$H$_5$; $R^3$=Cl;

wherein $R^1$, $R^2$ and $R^3$ correspond to the aforementioned chemical formula.

In a non-limiting embodiment, the amines and anilines can include but is not limited to a diamine curing agent such as 4,4'-methylenebis(3-chloro-2,6-diethylaniline), (Lonzacure® M-CDEA), which is available in the United States from Air Products and Chemical, Inc. (Allentown, Pa.). In alternate non-limiting embodiments, the amines and anilines for use in the present invention can include 2,4-diamino-3,5-diethyl-toluene, 2,6-diamino-3,5-diethyl-toluene and mixtures thereof (collectively "diethyltoluenediamine" or "DETDA"), which is commercially available from Albemarle Corporation under the trade name Ethacure 100; dimethylthiotoluenediamine (DMTDA), which is commercially available from Albemarle Corporation under the trade name Ethacure 300; 4,4'-methylene-bis-(2-chloroaniline) which is commercially available from Kingyorker Chemicals under the trade name MOCA. DETDA can be a liquid at room temperature with a viscosity of 156 cPs at 25° C. DETDA can be isomeric, with the 2,4-isomer range being from 75 to 81 percent while the 2,6-isomer range can be from 18 to 24 percent.

In a non-limiting embodiment, the amines and anilines can act as a catalyst in the polymerization reaction and can be incorporated into the resulting polymerizate.

Non-limiting examples of the amines and anilines can include ethyleneamines. Suitable ethyleneamines can include but are not limited to ethylenediamine (EDA), diethylenetriamine (DETA), triethylenetetramine (TETA), tetraethylenepentamine (TEPA), pentaethylenehexamine (PEHA), piperazine, morpholine, substituted morpholine, piperidine, substituted piperidine, diethylenediamine (DEDA), and 2-amino-1-ethylpiperazine. In alternative non-limiting embodiments, the amines and anilines can be chosen from one or more isomers of C.sub. 1–C.sub.3 dialkyl toluenediamine, such as but not limited to 3,5-dimethyl-2,4-toluenediamine, 3,5-dimethyl-2,6-toluenediamine, 3,5-diethyl-2,4-toluenediamine, 3,5-diethyl-2,6-toluenediamine, 3,5-diisopropyl-2,4-toluenediamine, 3,5-diisopropyl-2,6-toluenediamine, and mixtures thereof. In alternative non-limiting embodiments, the amines and anilines can be methylene dianiline or trimethyleneglycol di(para-aminobenzoate).

In alternate non-limiting embodiments of the present invention, the amines and anilines can include one of the following general structures:

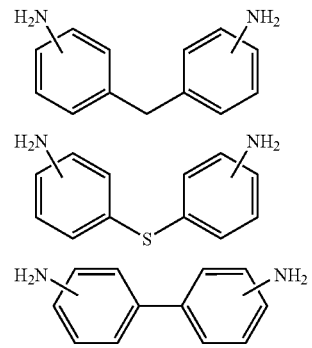

In further alternative non-limiting embodiments, the amines and anilines can include one or more methylene bis anilines which can be represented by the following formulas:

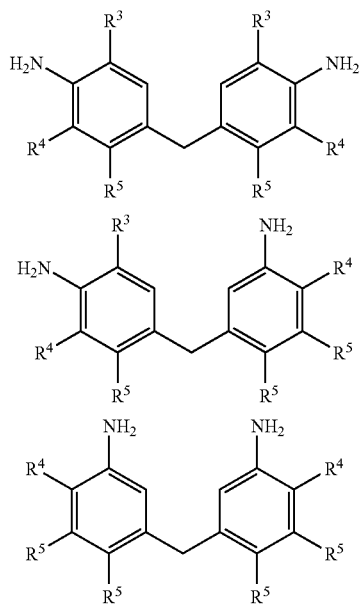

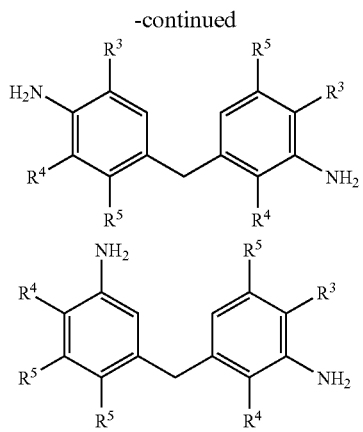

wherein $R^3$ and $R^4$ can each independently represent $C_1$–$C_3$ alkyl, and $R^5$ can be chosen from hydrogen and halogen, such as but not limited to chlorine and bromine.

The diamine represented by general formulas can be described generally as a 4,4'-methylene-bis(dialkylaniline). Suitable non-limiting examples of diamines can include but are not limited to 4,4'-methylene-bis(2,6-dimethylaniline), 4,4'-methylene-bis(2,6-diethylaniline), 4,4'-methylene-bis(2-ethyl-6-methylaniline), 4,4'-methylene-bis(2,6-diisopropylaniline), 4,4'-methylene-bis(2-isopropyl-6-methylaniline) and 4,4'-methylene-bis(2,6-diethyl-3-chloroaniline).

In further alternative non-limiting embodiments, the amines and anilines can include one or more sulfides which can be represented by the following general formula:

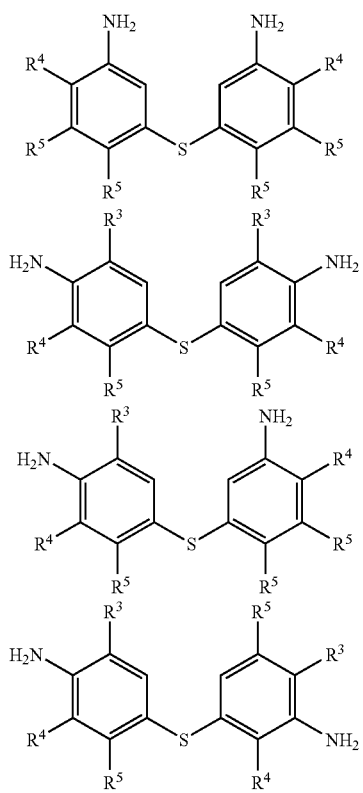

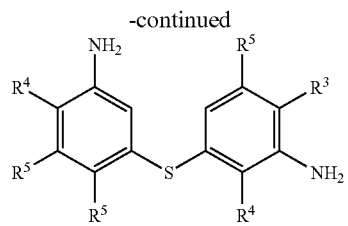

wherein $R^3$ and $R^4$ can each independently represent $C_1$–$C_3$ alkyl, and $R^5$ can be chosen from hydrogen and halogen, such as but not limited to chlorine and bromine.

In further alternative non-limiting embodiments, the amines and anilines can include one or more dianilines which can be represented by the following formulas:

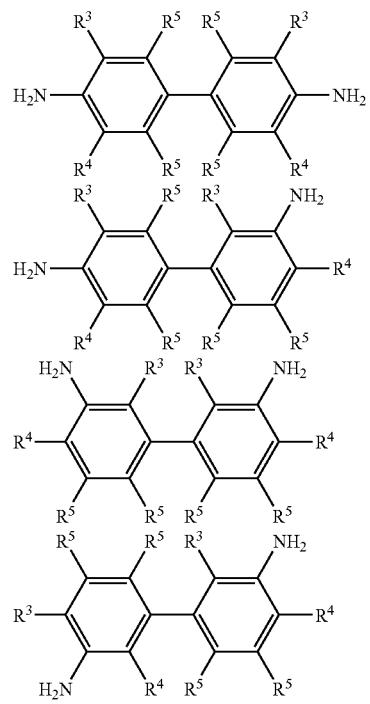

wherein $R^3$ and $R^4$ can each independently represent $C_1$–$C_3$ alkyl, and $R^5$ can be chosen from hydrogen and halogen, such as but not limited to chlorine and bromine.

In another non-limiting embodiment, the amines and anilines can include materials which can be represented by the following general structure:

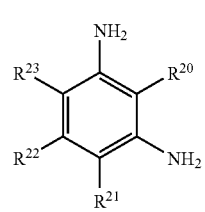

wherein $R^{20}$, $R^{21}$, $R^{22}$, and $R^{23}$ can be independently chosen from H, $C_1$–$C_3$ alkyl, $CH_3$—S— and halogen, such as but not limited to chlorine or bromine. In a non-limiting embodiment of the present invention, the amines and anilines, represented by general formula, can include diethyl toluene diamine (DETDA) wherein $R^{23}$ is methyl, $R^{20}$ and $R^{21}$ are each ethyl and $R^{22}$ is hydrogen. In a further non-limiting embodiment, the amines and anilines can include 4,4'-methylenedianiline.

Non-limiting examples of amines and anilines include those amines and anilines with the following general structure:

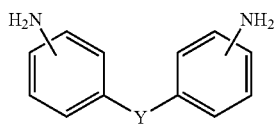

wherein Y may be S—S, S(O)$_2$—S(O)$_2$—,

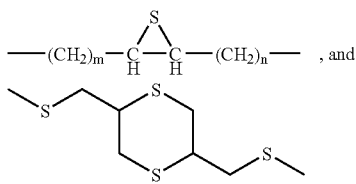

wherein m and n are integers from 0 to 5.

This invention relates to a sulfur-containing composition comprising the reaction product of four reactable components, in which at least one reactable component contains a sulfur atom. Accordingly to this invention, four embodiments will each have only one reactable component that contains a sulfur atom. Another six embodiments will each have two reactable components that contain a sulfur atom. Another four embodiments will each have three reactable components that contain a sulfur atom. One embodiment will have all four reactable components that contain a sulfur atom. The resultant golf equipment or components using these sulfur-containing compositions show improved properties, in particular, improved resiliency and greater distance.

In one embodiment of this invention, the first reactable component is the only reactable component that contains a sulfur atom. According to this embodiment, suitable polyisocyanates for use as the first reactable component will include, but not limited to, aliphatic and aromatic polyisocyanates containing sulfide, disulfide or sulfone linkages. According to this embodiment, any polyisothiocyanates will be suitable for use as the first reactable component. According to this embodiment, suitable compounds for the second, third and fourth reactable components will not contain any sulfur atom.

In another embodiment of this invention, the second reactable component is the only reactable component that contains a sulfur atom. According to this embodiment, suitable polyols for use as the second reactable component will include, but not limited to, polyols containing sulfide, disulfide or sulfone linkages. According to this embodiment, any polythiols will be suitable for use as the second reactable component. According to this embodiment, suitable compounds for the first, third and fourth reactable components will not contain a sulfur atom.

In another embodiment of this invention, the third reactable component is the only reactable component that contains a sulfur atom. According to this embodiment, suitable epoxides for use as the third reactable component include, but not limited to, epoxides with sulfide, disulfide or sulfone linkages. According to this embodiment, any episulfide will be suitable for use as the third reactable component. According to this embodiment, suitable compounds for the first, second and fourth reactable components will not contain a sulfur atom.

In another embodiment of this invention, the fourth reactable component is the only reactable component that contains a sulfur atom. According to this embodiment, suitable amines and anilines for use as the fourth reactable component include, but not limited to, amines and anilines with sulfide, disulfide or sulfone linkages. According to this embodiment, suitable compounds for the first, second and third reactable components will not contain a sulfur atom.

In another embodiment of this invention, the first and the second reactable components are the only two components that contain a sulfur atom. According to this embodiment, suitable polyisocyanates for use as the first reactable component will include, but not limited to, aliphatic and aromatic polyisocyanates containing sulfide, disulfide or sulfone linkages. According to this embodiment, any polyisothiocyanates will be suitable for use as the first reactable component. According to this embodiment, suitable polyols for use as the second reactable component will include, but not limited to, polyols containing sulfide, disulfide or sulfone linkages. According to this embodiment, any polythiols will be suitable for use as the second reactable component. According to this embodiment, suitable compounds for the third and fourth reactable components will not contain a sulfur atom.

In another embodiment of this invention, the first and the third reactable components are the only two reactable components that contain a sulfur atom. According to this embodiment, suitable polyisocyanates for use as the first reactable component will include, but not limited to, aliphatic and aromatic polyisocyanates containing sulfide, disulfide or sulfone linkages. According to this embodiment, any polyisothiocyanates will be suitable for use as the first reactable component. According to this embodiment, suitable epoxides for use as the third reactable component include, but not limited to, epoxides with sulfide, disulfide or sulfone linkages. According to this embodiment, any episulfide will be suitable for use as the third reactable component. According to this embodiment, suitable compounds for the second and fourth reactable components will not contain a sulfur atom.

In another embodiment of this invention, the first and the fourth reactable components are the only two reactable components that contain a sulfur atom. According to this embodiment, suitable polyisocyanates for use as the first reactable component will include, but not limited to, aliphatic and aromatic polyisocyanates containing sulfide, disulfide or sulfone linkages. According to this embodiment, any polyisothiocyanates will be suitable for use as the first reactable component. According to this embodiment, suitable amines and anilines for use as the fourth reactable component include, but not limited to, amines and anilines with sulfide, disulfide or sulfone linkages. According to this embodiment, suitable compounds for the second and third reactable components will not contain a sulfur atom.

In another embodiment of this invention, the second and the third reactable components are the only two reactable components that contain a sulfur atom. According to this embodiment, suitable polyols for use as the second reactable component will include, but not limited to, polyols containing sulfide, disulfide or sulfone linkages. According to this embodiment, any polythiols will be suitable for use as the second reactable component. According to this embodiment, suitable epoxides for use as the third reactable component include, but not limited to, epoxides with sulfide, disulfide or sulfone linkages. According to this embodiment, any episulfide will be suitable for use as the third reactable component. According to this embodiment, suitable compounds for the first and fourth reactable components will not contain a sulfur atom.

In another embodiment of this invention, the second and the fourth reactable components are the only two reactable components that contain a sulfur atom. According to this embodiment, suitable polyols for use as the second reactable component will include, but not limited to, polyols containing sulfide, disulfide or sulfone linkages. According to this embodiment, any polythiols will be suitable for use as the second reactable component. According to this embodiment, suitable amines and anilines for use as the fourth reactable component include, but not limited to, amines and anilines with sulfide, disulfide or sulfone linkages. According to this embodiment, suitable compounds for the first and third reactable components will not contain a sulfur atom.

In another embodiment of this invention, the third and the fourth reactable components are the only two reactable components that contain a sulfur atom. According to this embodiment, suitable epoxides for use as the third reactable component include, but not limited to, epoxides with sulfide, disulfide or sulfone linkages. According to this embodiment, any episulfide will be suitable for use as the third reactable component. According to this embodiment, suitable amines and anilines for use as the fourth reactable component include, but not limited to, amines and anilines with sulfide, disulfide or sulfone linkages. According to this embodiment, suitable compounds for the first and second reactable components will not contain a sulfur atom.

In another embodiment of this invention, the first, second, and third reactable components are the only three reactable components that contain a sulfur atom. According to this embodiment, suitable polyisocyanates for use as the first reactable component will include, but not limited to, aliphatic and aromatic polyisocyanates containing sulfide, disulfide or sulfone linkages. According to this embodiment, any polyisothiocyanates will be suitable for use as the first reactable component. According to this embodiment, suitable polyols for use as the second reactable component will include, but not limited to, polyols containing sulfide, disulfide or sulfone linkages. According to this embodiment, any polythiols will be suitable for use as the second reactable component. According to this embodiment, suitable epoxides for use as the third reactable component include, but not limited to, epoxides with sulfide, disulfide or sulfone linkages. According to this embodiment, any episulfide will be suitable for use as the third reactable component. According to this embodiment, suitable compounds for the fourth reactable component will not contain a sulfur atom.

In another embodiment of this invention, the first, second, and fourth reactable components are the only three reactable components that contain a sulfur atom. According to this embodiment, suitable polyisocyanates for use as the first reactable component will include, but not limited to, aliphatic and aromatic polyisocyanates containing sulfide, disulfide or sulfone linkages. According to this embodiment, any polyisothiocyanates will be suitable for use as the first reactable component. According to this embodiment, suitable polyols for use as the second reactable component will include, but not limited to, polyols containing sulfide, disulfide or sulfone linkages. According to this embodiment, any polythiols will be suitable for use as the second reactable component. According to this embodiment, suitable amines and anilines for use as the fourth reactable component include, but not limited to, amines and anilines with sulfide, disulfide or sulfone linkages. According to this embodiment, suitable compounds for the third reactable component will not contain a sulfur atom.

In another embodiment of this invention, the first, third, and fourth reactable components are the only three reactable components that contain a sulfur atom. According to this embodiment, suitable polyisocyanates for use as the first reactable component will include, but not limited to, aliphatic and aromatic polyisocyanates containing sulfide, disulfide or sulfone linkages. According to this embodiment, any polyisothiocyanates will be suitable for use as the first reactable component. According to this embodiment, suitable epoxides for use as the third reactable component include, but not limited to, epoxides with sulfide, disulfide or sulfone linkages. According to this embodiment, any episulfide will be suitable for use as the third reactable component. According to this embodiment, suitable amines and anilines for use as the fourth reactable component include, but not limited to, amines and anilines with sulfide, disulfide or sulfone linkages. According to this embodiment, suitable compounds for the second reactable component will not contain a sulfur atom.

In another embodiment of this invention, the second, third, and fourth reactable components are the only three reactable components that contain a sulfur atom. According to this embodiment, suitable polyols for use as the second reactable component will include, but not limited to, polyols containing sulfide, disulfide or sulfone linkages. According to this embodiment, any polythiols will be suitable for use as the second reactable component. According to this embodiment, suitable epoxides for use as the third reactable component include, but not limited to, epoxides with sulfide, disulfide or sulfone linkages. According to this embodiment, any episulfide will be suitable for use as the third reactable component. According to this embodiment, suitable amines and anilines for use as the fourth reactable component include, but not limited to, amines and anilines with sulfide, disulfide or sulfone linkages. According to this embodiment, suitable compounds for the first reactable component will not contain a sulfur atom.

In another embodiment of this invention, the first, second, third, and fourth reactable components all contain a sulfur atom. According to this embodiment, suitable polyisocyanates for use as the first reactable component will include, but not limited to, aliphatic and aromatic polyisocyanates containing sulfide, disulfide or sulfone linkages. According to this embodiment, any polyisothiocyanates will be suitable for use as the first reactable component. According to this embodiment, suitable polyols for use as the second reactable component will include, but not limited to, polyols containing sulfide, disulfide or sulfone linkages. According to this embodiment, any polythiols will be suitable for use as the second reactable component. According to this embodiment, suitable epoxides for use as the third reactable component include, but not limited to, epoxides with sulfide, disulfide or sulfone linkages. According to this embodiment, any episulfide will be suitable for use as the third reactable component. According to this embodiment, suitable amines and anilines for use as the fourth reactable component include, but not limited to, amines and anilines with sulfide, disulfide or sulfone linkages.

In a non-limiting embodiment, the sulfur-containing compositions can be polymerized by degassing the prepolymer under vacuum, and degassing the amines and anilines, and the polyols and polythiols under vacuum. The amine-containing curing agent and the optional polythiol can then be mixed with the prepolymer using, for example, an impeller or extruder. The resultant reaction mixture can be added to a mold and then the mold can be heated. The thermal cure cycle can vary depending on, for example, the reactivity and molar ratio of the reactants and the presence of any catalyst(s). In a non-limiting embodiment, the thermal cure cycle can include heating the prepolymer, curing agent, and optional polythiol mixture from room temperature to 200° C. over a period of from 0.5 hours to 72 hours.

Advantageously, the polymerization, solidification, or gelation times of the reactive mixture of the present invention should typically not be more than about 60 seconds, preferably not more than about 45 seconds, more preferably from about 0.25 seconds to 30 seconds, most preferably from about 0.5 seconds to 15 seconds, all at ambient or elevated temperatures. In various other embodiments, the polymerization, solidification, or gelation times of the reactive mixture of the present invention are from about 1 second to 10 seconds or from about 1 second to 5 seconds. In particular, reaction injection molding can be used to form a core layer, intermediate layer, cover layer, or any portion or combination of layers thereof. Also castable molding process and other methods can be employed.

Reaction injection molding ("RIM") according to the invention includes any injection molding process in which two or more components are reactive upon contact and/or addition into a mold cavity. The invention further includes several different sub-types of reaction injection molding, e.g., such as liquid injection molding ("LIM"), reinforced reaction injection molding ("RRIM"), and structural reaction injection molding ("SRIM"). Liquid injection molding occurs when the two or more components are in liquid form and includes subclasses micro-LIM and nano-LIM, which refer to smaller and much smaller injection volumes, respectively, as compared to most commercial processes. Reinforced RIM occurs with one or more filler materials being added to the two or more components prior to injection into the mold cavity. Structural RIM occurs where there is a preform around which the two or more components are injected within the mold cavity. The preform is generally in fiber or mesh form but may be made from any material sufficient to substantially withstand the injection pressures typically associated with the RIM process. In SRIM, a composite material is typically formed.

In a preferred embodiment, each of the first and second reactable components have a viscosity not more than about 20,000 cPs, preferably not more than about 15,000 cPs, more preferably from about 25 cPs to 10,000 cPs, most preferably from about 25 cPs to 5,000 cPs, until the reactable components are mixed together or the reactive mixture is injected into the cavity or mold. In another preferred embodiment, all the reactable components, or mixtures thereof, that can be contacted to form the reactive mixture have viscosities similar to those of the first and second reactable components. In yet another preferred embodiment, each reactable component has a viscosity not more than about 5,000 cPs at a temperature of about 150° F. In one embodiment, the mixture is injected into the mold or cavity at an injection pressure of not more than about 2,500 psi.

In another embodiment of this invention, the various layers of the golf ball may be prepared by subjecting the sulfur-containing compositions under the conditions of castable molding process as described in commonly-owned U.S. Pat. No. 5,006,297 to Brown et al. and U.S. Pat. No. 5,733,428 to Calabria et al. The term "castable" means capable of being cast into one or more layers in a golf ball. With a conventional castable urethane process, materials having viscosities greater than about 3,500 are required and also require a pot life of greater than about 35 seconds. Due to the very thin nature, it has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers. The castable, reactive liquid employed to form the urethane elastomer material can be applied over the core using a variety of application techniques such as spraying, dipping, spin coating, or flow coating methods which are well known in the art. Further description of the castable molding process can also be found in commonly-owned U.S. Pat. No. 6,685,579 to Sullivan.

These polymerization, solidification, or gelation times, as well as the viscosities of the reactable components, are applicable at ambient temperature (i.e., about 20° C. to 30° C.) or at elevated temperatures, for example, such as those at which the reactable components are separately contained or those at which the reactive mixture is injected. Preferably, when the polymerization, solidification, or gelation times, or the viscosities of the reactable components, are applied at elevated temperatures, the elevated temperature is typically the temperature at which the reactive mixture is injected.

The term "gelation," as described in commonly-owned U.S. Pat. No. 6,645,088 to Wu et al., which is incorporated by reference in its entirety, refers to the increase of viscosity sufficient to prevent or substantially retard the flow of a material into a mold or cavity or through an orifice. Advantageously, the polymerization, solidification, or gelation times of the reactive mixture of the present invention should typically not be more than about 60 seconds, preferably not more than about 45 seconds, more preferably from about 0.25 seconds to 30 seconds, most preferably from about 0.5 seconds to 15 seconds, all at ambient or elevated temperatures.

In some embodiments of this invention, catalysts may optionally be used to modify or facilitate the reaction among the four reactable components. The catalyst may be contained separately from all other components or may be added to one or more other components to form a mixture. In one embodiment, the catalyst is added to the first reactable component containing the polyisocyanates and polyisothiocyanates. In another embodiment, the catalyst is added to the the second, third or fourth reactable components. Suitable catalysts include, but are not limited to, tin catalysts, for example, such as dibutyltin dilaurate; amine catalysts, for example, a trialkylamine such as triethylenediamine, triethylamine, tributylamine, or a mixture thereof; organic acids, for example, such as acetic acid, oleic acid, or a mixture thereof; delayed catalysts, for example, such as POLYCAT™ SA-1, POLYCAT™ SA-102, and the like, or a mixture thereof; or combinations thereof. When a catalyst is present, it is added in an amount sufficient to catalyze or facilitate the reaction of the components in the reactive mixture, preferably in an amount from about 0.001% to 3%, based on the total weight of the first and second reactable components.

Fillers added to one or more layers of the golf equipment, e.g., a golf ball, typically include processing aids or compounds to affect rheological and mixing properties, the specific gravity (i.e., density-modifying fillers), the modulus, the tear strength, reinforcement, and the like. A density adjusting filler may be used to control the moment of inertia, and thus the initial spin rate of the ball and spin decay. Fillers are typically polymeric or inorganic in nature, and, when used, are typically present in an amount from about 0.1 to 50 weight percent of the layer or portion in which they are included. Any suitable filler available to one of ordinary skill in the art may be used. Exemplary fillers include, but are not limited to, precipitated hydrated silica; clay; talc; glass fibers; aramid fibers; mica; calcium metasilicate; barium sulfate; zinc sulfide; lithopone; silicates; silicon carbide; diatomaceous earth; carbonates such as calcium carbonate and magnesium carbonate; metals such as titanium, tungsten, aluminum, bismuth, nickel, molybdenum, iron, copper, boron, cobalt, beryllium, zinc, and tin; metal alloys such as steel, brass, bronze, boron carbide whiskers, and tungsten carbide whiskers; metal oxides such as zinc oxide, iron oxide, aluminum oxide, titanium oxide, magnesium oxide, and zirconium oxide; particulate carbonaceous materials such as graphite, carbon black, cotton flock, natural bitumen, and cellulose flock; micro balloons such as glass and ceramic; fly ash; cured, ground rubber; or combinations thereof.

Other additive ingredients such as accelerators, e.g., tetra methylthiuram, processing aids, processing oils, plasticizers, colorants, e.g., dyes and pigments, as well as other additives well known to the ordinary-skilled artisan may also be used in the present invention in amounts sufficient to achieve the purpose for which they are typically used.

In an alternate embodiment, each reactable component may include at least two sets of precursor components that can be reacted to form at least two different polymers of an interpenetrating polymer network, at least one polymer being crosslinked. In addition, if any of the at least two component sets include a mixture of precursor components, then that mixture must be sufficiently non-reactive such that the sets of precursor components, when placed in contact with each other, can still form an interpenetrating polymer network (IPN). Some interpenetrating polymer networks form so quickly as to necessitate formation by a reaction injection molding (RIM) method, or by a castable molding process according to the invention. Additional descriptions of IPN compositions useful for golf equipment, or components thereof, according to the invention include those described in co-pending U.S. patent application Ser. No. 09/833,667, filed on Apr. 13, 2001, entitled "Golf Balls Containing Interpenetrating Polymer Networks," the disclosure of which is incorporated herein by express reference thereto.

In one embodiment, the golf equipment of the present invention may optionally include a foamed material. This foamed material may advantageously be made using the materials of the invention, as detailed herein. Suitable components of the foamed material may include those described in co-pending U.S. patent application Ser. No. 09/565,108, filed on May 4, 2000, the entire disclosure of which is incorporated herein by reference hereto, although the foamed material will be processed by a method according to the present invention. For example, an IPN can be foamed and used to form golf equipment, or a portion thereof. In addition, when the golf equipment of the invention includes a foamed material, the curing agent components may also include water.

When the golf equipment includes a foamed layer or portion, the foamed layer or portion may be an open-cell, a closed-cell, or a microcellular foam; the components may also include various foaming agents or blowing agents which may be readily selected by one of ordinary skill in the art, or which may include, but are not limited to, non-reactive gases, for example, such as freon, nitrogen, helium, carbon dioxide, or the like, or combinations thereof. Foamed materials may also include microspheres added in with one or more of the components. Polymeric, ceramic, metal, and glass microspheres may be solid or hollow, and filled or unfilled. Particularly suitable microcellular materials include those described in co-pending U.S. patent application Ser. No. 09/565,108, filed on May 4, 2000, previously incorporated herein by reference. In a preferred embodiment, the foamed layer or portion has a specific gravity of not more than about 1, more preferably not more than about 0.8, most preferably not more than 0.5.

In one embodiment, the golf equipment made according to the invention, or a portion thereof, has a thickness less than about 0.065 inches, alternately less than 0.01 inches. In particular, a layer of a golf ball, such as the cover, or a coating on a golf club face, can be prepared with the reaction injection molded material of the invention.

When the golf equipment is a golf ball, the center of the golf ball may be fluid-filled. The fluid-filled golf ball may advantageously contain a fluid, for example, as disclosed in co-pending U.S. application Ser. No. 09/496,353, filed Feb. 2, 2000, the entire disclosure of which is incorporated herein by reference hereto, which fluid may also possess some or all the properties detailed therein, e.g., such as fluid water activity, center fluid content, density, or specific gravity, or the like, or a combination thereof. The core of the golf ball may also be wound or non-wound.

Additionally, when butadiene rubber is used in one or more layers of the golf equipment, typically of golf balls, prepared according to the present invention, the uncured rubber typically has a Mooney viscosity greater than about 20, preferably greater than about 30, and more preferably greater than about 40. In one embodiment, the Mooney viscosity is about 40 to 60. Mooney viscosity is typically measured according to ASTM D1646-99. Such materials can preferably be included in one or more core layers.

In another embodiment, the moisture vapor transmission rate (MVTR) or fluid permeation rate of a layer or coating of the gelled or solidified reactive mixture is typically less than about 1,000 (g·mil)/(100 in$^2$·day), preferably less than about 750 (g·mil)/(100 in$^2$·day), more preferably less than about 500 (g·mil)/(100 in$^2$·day). For comparison purposes, it is desirable to test samples having a thickness of approximately 0.02 inches (20 mils) to relatively assess permeation or MVTR values.

Also when the golf equipment contains multiple layers, for example, such as in a multi-layer golf ball, a surface treatment between any two layers may be effected to improve the adhesion between those layers. The surface treatment may include mechanical abrasion, e.g., such as sandblasting; plasma treatment, including treatment at atmospheric pressure; corona treatment; flame treatment; wet chemical surface modification; application of adhesives or adhesion promoters, e.g., such as those available commercially as EASTMAN 343-1, EASTMAN 343-3, EASTMAN 515-2 (all from Eastman Chemical Co. of Kingsport, Tenn.), BAYER 8173, BAYER U42, BAYER U53, BAYER 140AQ (all from Bayer Corp. of Pittsburgh, Pa.), RICOBOND (from Ricon Resins, Inc. of Grand Junction, Colo.), WITCOBOND (from Witco Corp. of Greenwich Conn.), or the like, or a combination thereof. Advantageously, the surface treatment may be effected as recited in co-pending U.S.

application Ser. No. 09/389,058, filed on Sep. 2, 1999, the entire disclosure of which is incorporated herein by reference hereto.

When the golf equipment includes golf balls, the resultant golf balls prepared according to the invention typically will typically have dimple coverage greater than about 60 percent, preferably greater than about 65 percent, and more preferably greater than about 70 percent. Optionally, the golf balls also have a cover material hardness from about 15 Shore A to 85 Shore D, or a flexural modulus (measured according to ASTM D6272-98) of greater than about 500 psi (3.4 MPa). In some cases, the flexural modulus of the reaction injection molded golf equipment, or portion thereof, can be less than about 5,000 psi (34 MPa). In other cases, the flexural modulus of the reaction injection molded golf equipment, or portion thereof, can be less than about 300,000 psi (2.1 GPa). The golf balls also typically have a coefficient of restitution of greater than about 0.7, preferably greater than about 0.75, and more preferably greater than about 0.78, at an initial velocity of 125 ft/s. The golf balls also typically have an Atti compression of at least about 40, preferably from about 50 to 120, more preferably from about 60 to 100.

When the golf equipment is a golf ball, the golf ball construction may be such that it has "high spin" or "low spin" characteristics. In an embodiment when the golf balls according to the invention include more than one cover layer, the golf ball will typically include an outer cover layer having a first material hardness and another layer beneath the outer cover layer, be it an inner cover layer or an intermediate layer, having a second material hardness. In one embodiment, the first material hardness is greater than the second material hardness, wherein the golf ball is then typically characterized as a "low spin" ball, and the ball has lower spin when struck by a driver than the "high spin" embodiment. In an alternate embodiment, the first material hardness may be at least about 55 Shore D, or the second material hardness may be up to about 55 Shore D. In another embodiment, the second material hardness is greater than the first material hardness, wherein the golf ball is then typically characterized as a "high spin" ball, and the ball has higher spin when struck by a driver than the "low spin" embodiment. In an alternate embodiment, the second material hardness may be at least about 55 Shore D, or the first material hardness may be up to about 55 Shore D.

In yet another embodiment, both the first and the second material hardness are above about 55 Shore D. In still another embodiment, both the first and the second material hardness are below about 60 Shore D. All such hardnesses are measured on the material preferably using ASTM D2240-00.

Depending on the desired properties, golf equipment, primarily golf balls, prepared according to the invention can exhibit substantially the same or higher resilience, or coefficient of restitution ("COR"), with a decrease in compression or modulus, compared to equipment of conventional construction. Additionally, golf equipment prepared according to the invention can also exhibit substantially higher resilience, or COR, without an increase in compression, compared to equipment of conventional construction. Another measure of this resilience is the loss tangent, or tan delta., which is obtained when measuring the dynamic stiffness of an object. Loss tangent and terminology relating to such dynamic properties is typically described according to ASTM D4092-90. Thus, for golf balls, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked polybutadiene reaction product can be less than about 50,000 N/m at about −50° C. In one preferred embodiment, the dynamic stiffness can be from about 10,000 N/m to 40,000 N/m at about −50° C., more preferably from about 20,000 N/m to 30,000 N/m at about −50° C.

The dynamic stiffness is similar in some ways to dynamic modulus. Dynamic stiffness is dependent on probe geometry as described herein, whereas dynamic modulus is a unique material property, independent of geometry. The dynamic stiffness measurement has the unique attribute of enabling quantitative measurement of dynamic modulus and exact measurement of loss tangent at discrete points within a sample article. In the case of this invention, the article is at least a portion of a golf ball core. The polybutadiene reaction product preferably has a loss tangent below about 0.1 at about −50° C., and more preferably below about 0.07 at about −50° C.

As is well known to those of ordinary skill in the art, the time-temperature superposition principle may be used to emulate alternative deformation rates. Particularly for golf ball portions including polybutadiene, a 1-Hz oscillation at temperatures between about 0° C. and −50° C. are believed to be qualitatively equivalent to golf ball impact rates. Therefore, measurement of loss tangent and dynamic stiffness at about 0° C. to −50° C. may be used to accurately anticipate golf ball performance, preferably at temperatures from about −20° C. to −50° C.

The golf equipment, or the reaction injection molded portion thereof, e.g., a golf ball or golf ball layer, typically has a dynamic shear storage modulus of at least about $10^4$ dynes/cm$^2$, preferably from about $10^4$–$10^{10}$ dyn/cm$^2$, and more preferably from about $10^6$ to $10^8$ dyn/cm$^2$, when measured at about 23° C. and a frequency of 1 Hz. The reaction injection molded golf ball or golf ball layer also typically has a loss tangent no greater than about 1 at any temperature, preferably from about 0.01 to 0.5 at about 23° C., and more preferably from about 0.01 to 0.1 at about 23° C.

Another aspect of the invention relates to a grid scaffolding present in any portion of golf equipment that is below the outer surface. In the case of a golf ball, for example, the grid scaffolding may be present in any layer other than the outer cover layer (when more than one cover layer is present). The incorporation of this grid scaffolding in golf equipment according to the invention can advantageously improve performance properties or reduce the cost of manufacturing the golf equipment. For example, when the golf equipment is a golf ball, the presence of a grid scaffolding in one of the golf ball layers modifies at least one of the golf ball spin, feel, distance, or velocity. The modification of these golf ball properties may change with such characteristics as the density, the mechanical properties (e.g., compressive modulus, flexural modulus, strength, viscoelastic response, and the like), the thickness, the continuity, or the compatibility of the grid with the materials surrounding it. As a result, other properties or characteristics of the golf ball may be influenced, e.g., such as the moment of inertia, spin rate, ball weight, or the like, or combinations thereof. The grid scaffolding may be continuous or non-continuous, preferably non-continuous, and is typically symmetrical about a central mirror plane.

The grid scaffolding may also advantageously allow the material disposed above and beneath it to have an intermediate interface with which to interact. In addition, the discontinuities, e.g., gaps, if present, in the grid scaffolding may be filled with another material to allow the material disposed above and beneath it to have two intermediate interfaces with which to interact. Without being bound by theory, it is believed that the mechanical or structural integrity of the connection between the material disposed above and beneath the grid scaffolding may be desirably tailored to alter, for example, the properties of the golf equipment as a whole. In addition, the physical (or optionally chemical, if there is complementary functionality present) adhesion present between the grid scaffolding, the material disposed above and beneath, and optionally another material filled within the grid, may be effected without further adhesive, chemical, abrasive, or other treatment of the surfaces involved. It is believed that sufficient adhesion may occur because the surface area for contact between all the materials in such a composite can be increased by using such a grid scaffolding, as compared to adhesion between traditional layers. Additional treatments to increase adhesion of any of these components can, of course, be used if desired. In another embodiment, where the grid is continuous, adhesion and mechanical integrity can still be effected, although without another intermediate material.

The grid scaffolding according to the invention may be made by any appropriate manufacturing technique known to those of ordinary skill in the art. The cross-sectional shape or texture of the grid scaffolding may vary and can include a corrugated shell, preferably a bi-corrugated shell, a ribbed shell, a square-edged shell, or the like, or a combination thereof. The three-dimensional shape of the grid scaffolding can advantageously be tailored to the particular golf equipment in which it is incorporated. For example, the grid may be spherical or hemispherical for use in a golf ball, flat for use in a golf club head or a golf shoe sole, or cylindrical or frusto-conical for use in a golf club shaft, or the like.

Figure 2:
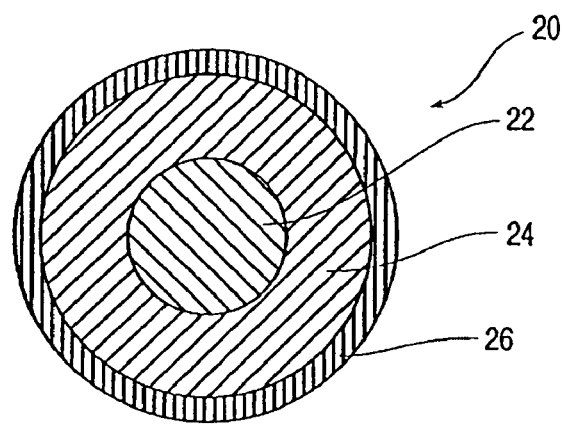
FIG. 2 illustrates a three-layer golf ball, in which at least one layer of the golf ball includes a reaction injection molded material according to the invention.
Figure 3:
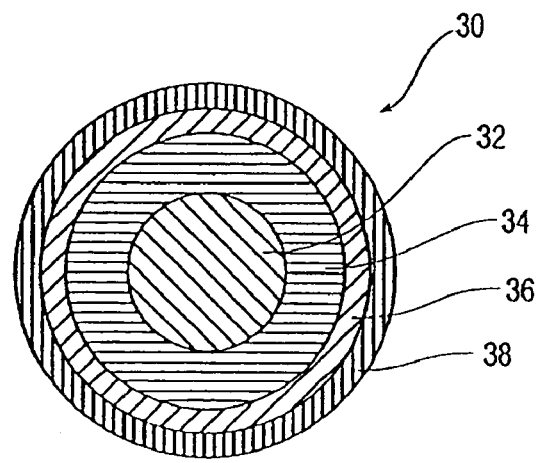
FIG. 3 illustrates a multi-layer golf ball, in which at least one layer of the golf ball includes a reaction injection molded material according to the invention.

Referring to FIG. 1, a golf ball 10 of the present invention can include a center 12 and a cover 16 surrounding the center 12. Referring to FIG. 2, a golf ball 20 of the present invention can include a center 22, a cover 26, and at least one intermediate, or intermediate, layer 24 disposed between the cover and the center. Each of the cover and center layers in FIG. 1 or 2 may include more than one layer (not shown); i.e., the golf ball can be a conventional three-piece wound ball, a two-piece ball, a ball having a multi-layer core and an intermediate layer or layers, etc. Also, FIG. 3 shows a golf ball 30 of the present invention including a center 32, a cover 38, and two intermediate layers 34, 36 disposed there between. In another embodiment, the ball 30 illustrates a two part center 32, 34, an intermediate layer 36, and a cover 38. The two part center can include, for examples, two solid layers, a solid layer 32 and a wound layer 34 or grid 34 disposed about it, or a fluid-filled center 32 and a shell 34 to contain the fluid. Additionally, although FIGS. 1–3 show golf balls with only one cover layer, it will be appreciated that any number or type of cover layers may be used. In each of these FIGS. and embodiments, at least one layer includes a reaction injection molded material or is formed by reaction injection molding.

Figure 4:
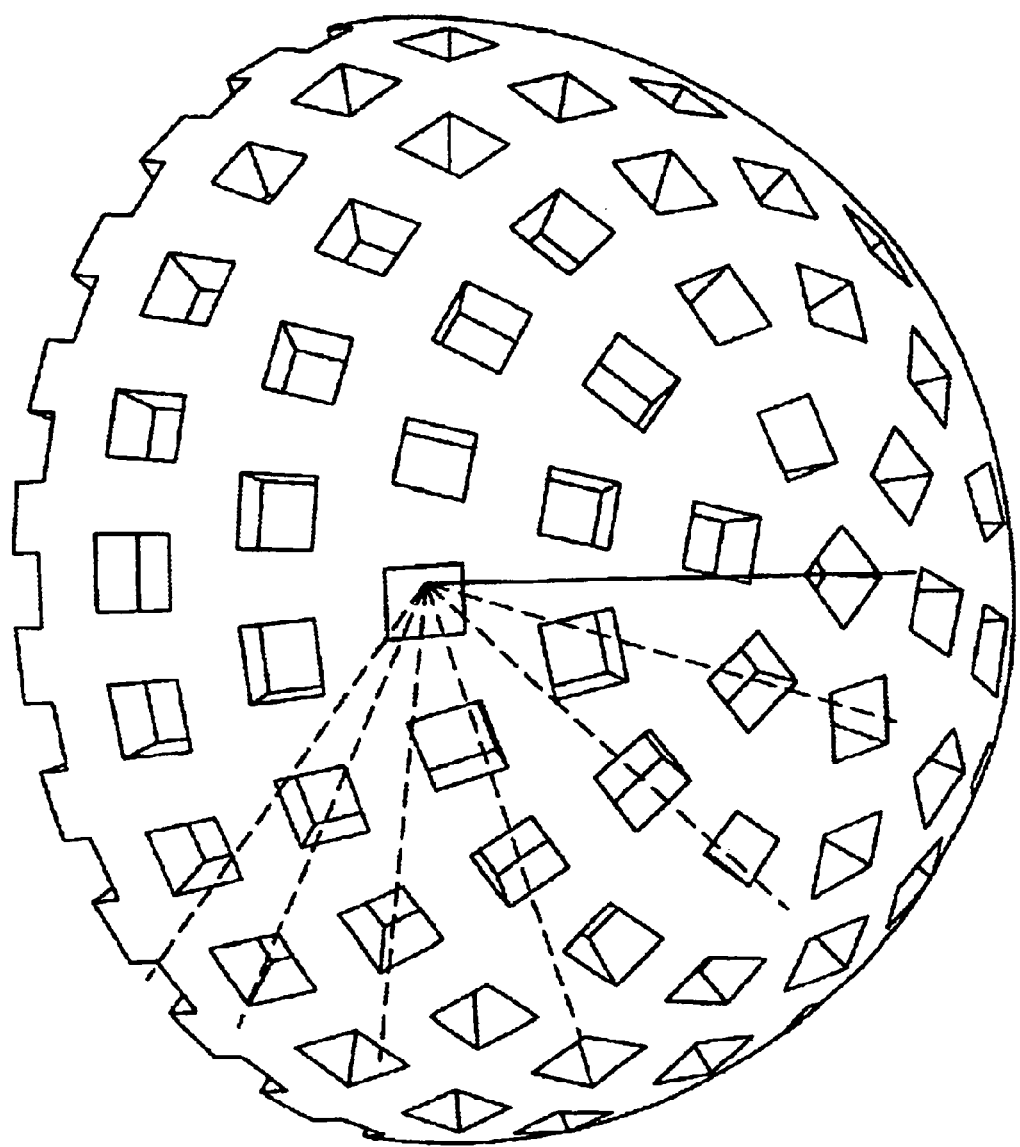
FIG. 4 illustrates a hemispherical grid scaffolding useful in forming a portion of an intermediate layer of a golf ball according to the invention.

Any one of the center, core, intermediate layers, or inner cover layers (not the outer cover layer, when more than one cover layer is present), may contain dual hemispheres of a grid scaffolding (i.e., thus forming a non-continuous spherical grid), one hemisphere of which is shown, for example, in FIG. 4. Alternately, one continuous spherical grid scaffolding may be used instead of a non-continuous grid formed from two opposing hemispherical scaffolds. In one embodiment, an intermediate or an inner cover layer (when more than one cover layer is present) of a multi-layer golf ball according to the invention contains dual hemispheres of this grid scaffolding. In this embodiment, the layer that contains this grid scaffolding (i.e., the grid layer), may also contain a polymeric material disposed about or beneath the dual hemispherical grid scaffolding. In a preferred embodiment, the polymeric material penetrates corrugations in the dual hemispheres of the grid scaffolding and is disposed about, through, and beneath the grid scaffolding in the grid layer.

EXAMPLES

The following examples are only representative of the methods and materials for use in golf ball compositions and golf balls of this invention, and are not to be construed as limiting the scope of the invention in any way.

Example 1

Polyurethane RIM Composition for Use in One or More Golf Ball Layers

| COMPONENTS | EQUIVALENTS |
|---|---|
| Quasi-Prepolymer | 1 |
| Polyol | 0.215 |
| Diamine | 0.735 |
| Organometallic Catalyst | 0.05% based on total of first three components |
| Tertiary Amine Catalyst | 0.05% based on total of first three components |
| Filler | 3.5% based on total of first three components |

The quasi-prepolymer of Example 1 is, in one embodiment, an aromatic diisocyanate-endcapped, 2,000-molecular-weight (number average) polyether glycol, more specifically an MDI/PTMEG quasi-prepolymer, e.g., such as one which has an isocyanate content of about 15.3% and is commercially available from Polyurethane Specialties Co., Inc., of Lyndhurst, N.J. The polyol of Example 1 is, in one embodiment, a polyether polyol, especially a polytetramethylene glycol, and has a number average molecular weight above about 400 g/mol, in one embodiment approximately 2,000 g/mol. The diamine can be any suitable diamine, in one embodiment being aromatic and liquid, e.g., such as ETHACURE™ 100, which commercially available from Albemarle Corp., of Baton Rouge, La. The organometallic catalyst is preferably dibutyltin dilaurate, e.g., such as DABCO T-12, and the amine catalyst preferably includes a tertiary amine, e.g., such as DABCO® 33-LV, which is a 33% solution of triethylenediamine in dipropylene glycol, both of which catalyst examples are commercially available from Air Products & Chemicals, Inc., of Allentown, Pa. The filler is, in one embodiment, a white dispersion containing finely dispersed pigment in the form of a paste, e.g., such as in HCC-19584, which is commercially available from PolyOne of Massillion, Ohio.

The quasi-prepolymer is added to a first container separate from the polyol and diamine components, which are added to a second container. The two catalysts and the filler components may each be added to either container, although generally these three components will all be added to the second container along with the polyol and diamine components. The contents of the first container and second container are mixed and immediately injected into a mold cavity to form a layer of a golf ball, preferably a cover layer, more preferably the outer cover layer. Within about 60 seconds, at any temperature at or above ambient temperature, the layer is substantially polymerized and/or crosslinked to allow demolding of the golf ball, or portion thereof, containing a reaction-injection-molded layer.

It is to be understood that the invention is not to be limited to the exact configuration as illustrated and described herein. For example, it should be apparent that a variety of materials would be suitable for use in the composition or method of making the golf equipment according to the Detailed Description of the Preferred Embodiments. Accordingly, all expedient modifications readily attainable by one of ordinary skill in the art from the disclosure set forth herein, or by routine experimentation therefrom, are deemed to be within the spirit and scope of the invention as defined by the appended claims.

Example 2

Prepolymer with 4.5% NCO to 9.0% NCO made with excess of 4,4'-diisothiocyanatobenzophenenone is reacted with polyether polyol such as polytetramethyleneglycol (MW 2000). The excess of the isocyanate in the prepolymer is reacted with Ethacure 300 and 3.5% HCC-19584, which is a white dispersion supplied by Polyone Dispersion. Ethacure 300 is made by Albemerle Corporation. The stoichiometric ratio of prepolymer to curative blend is 1:0.95.

What is claimed is:

1. A sulfur-containing composition for golf equipment, the composition comprising:
    a first reactable component, further comprising a polyisocyanate, a polyisothiocyanate, or a combination thereof;
    a second reactable component, further comprising a polyol;
    a third reactable component, further comprising an epoxide; and
    a fourth reactable component, further comprising an amine, an aniline or a combination thereof;
    wherein the first reactable component is the only reactable component containing a sulfur atom.

* * * * *